US005497208A

United States Patent [19]
Sato et al.

[11] Patent Number: 5,497,208
[45] Date of Patent: Mar. 5, 1996

[54] CAMERA HAVING A LENS SHUTTER MECHANISM

[75] Inventors: Yu Sato, Hachioji; Kazutoshi Shiratori; Hiroyoshi Watanabe, both of Hino, all of Japan

[73] Assignee: Olympus Optical Co., Ltd., Tokyo, Japan

[21] Appl. No.: 304,501

[22] Filed: Sep. 9, 1994

[30] Foreign Application Priority Data

Sep. 10, 1993 [JP] Japan .................................. 5-225867
Sep. 10, 1993 [JP] Japan .................................. 5-225868
Sep. 10, 1993 [JP] Japan .................................. 5-225869
Sep. 10, 1993 [JP] Japan .................................. 5-225870

[51] Int. Cl.$^6$ ............................................. G03B 9/08
[52] U.S. Cl. ......................................... 354/234.1; 354/230
[58] Field of Search ............................... 354/230, 234.1

[56] References Cited

U.S. PATENT DOCUMENTS 4,650,306  3/1987  Ishida .
5,109,250  4/1992  Shinozaki et al. .

Primary Examiner—Monroe H. Hayes
Attorney, Agent, or Firm—Louis Weinstein

[57] ABSTRACT

A camera having a lens shutter mechanism in accordance with the present invention comprises sectors lying in a lens frame and forming a predetermined exposure aperture, a drive ring for opening and closing the sectors, a high-speed sector opening lever and a low-speed sector opening lever which drive the drive ring through an interlock lever, a plurality of springs having different strengths and constraining the high-speed sector opening lever and low-speed sector opening lever, a sector closing lever for driving the high-speed sector opening lever and low-speed sector opening lever in a direction causing the sectors to close, a mode changing member for changing shutter speeds by selecting whether both or either of the high-speed sector opening lever and low-speed sector opening lever should be driven, a charge cam gear for resetting the shutter mechanism to an initial position after exposure is completed, and a groove bored along the optical axis in a camera body and designed to guide the drive ring along the optical axis when the lens frame collapses and to restrain the drive ring from rotating about the optical axis after the lens frame completes collapsing. Only a minimum number of required members are disposed in a lens frame and the remaining members are arranged in a camera body. This results in a compact camera.

25 Claims, 18 Drawing Sheets

CAMERA HAVING A LENS SHUTTER MECHANISM

BACKGROUND OF THE INVENTION

1. Field of the Invention

The present invention relates to a camera having a lens shutter mechanism, and more particularly, to a camera having a lens shutter mechanism capable of changing aperture speeds.

2. Description of the Related Art

Various shutter lens mechanisms capable of changing shutter speeds that are synonymous of aperture speeds have been known in the past. For example, a technique using a governor is an example of a technique of changing shutter opening speeds.

Japanese Patent Laid-Open No. 55-96925 has disclosed a technological means for opening or closing sectors using a magnetic force means such as a motor. The voltage to be applied to a conductor such as a coil lying in a magnetic field or the duty ratio of pulsating voltage produced by a pulse oscillator is varied in order to change speeds of opening and closing sectors.

The means disclosed in the Japanese Patent Laid-Open No. 55-96925 is advantageous to a programmable shutter actuated at a low shutter speed. However, there are difficulties in realizing a high-speed shutter because when a magnetic force is used to open and close sectors, a high torque is hardly yielded. For realizing a high-speed shutter, springs must be employed to utilize the constraining forces.

Japanese Patent Laid-Open No. 3-116032 has disclosed another example, wherein the constraining force exerted by a first spring resting on a member for driving sectors is utilized to open sectors at a low speed, and the constraining force exerted by another spring or a second spring resting on the member as well as the constraining force exerted by the first spring is utilized to open the sectors at a high speed. In this mechanism, the switching of the springs is achieved by rotating a ring mounted in a lens frame. Release or closing of shutter blades is triggered by an actuator.

The Japanese Patent Laid-Open No. 3-116032 describes a structure in which one spring is used to constrain a single member to move in a direction permitting low-speed opening and another spring is added for a movement in a direction permitting high-speed opening. This structure is very complex, resulting in increases in the number of assembling processes and in cost. Moreover, it is hard to manage two spring forces. This results in unstable sector opening speeds. Furthermore, since a setting ring mounted in a lens frame is used to change sector opening speeds, when exposure modes are changed, not only a camera body but also a lens frame must be manipulated for mode selection. Thus, complex and time-consuming manipulations are needed for mode selection.

As for location of a lens shutter mechanism in a camera, various proposals have been made in the past. For example, Japanese Patent Laid-Open No. 48-29427 describes a lens shutter mechanism that is arranged along an arc on an outer circumference of a lens and thus stowed in a lens frame. This kind of arrangement of a lens shutter mechanism is generally adopted.

In the Japanese Patent Laid-Open No. 48-29427, the entire shutter mechanism is disposed in a lens frame. This poses a problem that there arises a difficulty in realizing a small-sized lens frame. Eventually, a camera body becomes larger in size.

Another example of the lens shutter mechanism is described in Japanese Examined Patent Publication No. 47-28939, wherein a shutter mechanism is divided into two portions that are respectively arranged inside and outside of a lens frame. A major portion of the shutter mechanism is disposed outside the lens frame. The major portion is deconcentrated two-dimensionally over a wide range of a front surface of a camera body.

According to the Japanese Examined Patent Publication No. 47-28939, the shutter mechanism is deconcentrated over the front surface of the camera body. This means that the shutter mechanism lies in front of a spool chamber or a Patrone chamber. The thickness of the camera body therefore increases by the thickness of the shutter mechanism.

Yet another example has been disclosed in Japanese Patent Laid-Open No. 54-24621, wherein a base locked in a lens frame is bent in the form of a letter L, and part of a shutter mechanism is disposed two-dimensionally in a lower area of a camera body. In this case, members other than the lens frame are deconcentrated two-dimensionally along an outer circumference of the lens frame or in the lower area of the camera body.

The Japanese Patent Laid-Open No. 54-24621 has a problem that since a film wind gear array lies in the lower area of a camera body, when the shutter mechanism is disposed in the lower area, the camera body cannot be designed compactly. Moreover, the base in which the shutter mechanism is mounted is locked in the lens frame. This structure of a shutter mechanism is therefore unsuitable for a type of camera in which when unused, a lens frame is collapsed.

Sectors forming a lens shutter pass a beam of light reflected from an object only for the purpose of photography. The sectors must not be opened accidentally on any other occasion except for photography. In a generally known mechanism for preventing the sectors from opening incorrectly, a spring is attached to sectors or a member for driving sectors such as a drive ring. The spring force is used to constrain the sectors to remain closed.

An example of this kind of mechanism is described in Japanese Unexamined Utility Model Publication No. 2-55224 relating to a camera in which lenses are reset to a position outside of an effective focusing range every after photographing operation. That is to say, a boss or any other member for immobilizing closed sectors protrudes from a position, to which lenses are reset, on a camera body, thus preventing incorrect opening of the sectors. The member for immobilizing the sectors after the sectors close is designed to immobilize the sectors directly or immobilize a switch lever.

According to the Japanese Unexamined Utility Model Publication No. 2-55224, when the boss attached to the camera body is used to directly immobilize the sectors, since the sectors are formed with very thin plate members, the sectors may be damaged. The sectors open and close in a limited space at a high speed. Therefore, when the sectors are damaged, it may lead to malfunction. Moreover, this structure makes it necessary to include an auxiliary boss as an immobilizing boss. This is disadvantageous cost-wise. Besides, an extra space is required for attaching a boss. Furthermore, a shutter mechanism is entirely incorporated in a lens frame, making it difficult to realize a small-sized camera.

Yet another example is described in Japanese Patent Laid-Open No. 4-86635, wherein a lens frame is reset to a predetermined reset position every after photography, and a pin protruding from the the reset position on the lens frame is coupled with a switch lever in order to prevent incorrect opening of sectors. The last-mentioned patent publication relates to a type of camera in which when a camera is unused, a lens frame collapses to enter a camera body. Herein, when the camera is used, a constraining force exerted by a spring is used to constrain a shutter means to close. When the lens frame collapses, the pin protruding from the camera body toward an object immobilizes the switch lever so as to prevent incorrect opening of sectors.

According to the Japanese Patent Laid-Open No. 4-86635, a spring is used to constrain sectors to close and to thus prevent the sectors from opening incorrectly. Herein, a force for opening the sectors must be strong enough to cancel out the force for constraining the sectors to close. When a spring force is employed to open and close sectors, there arises a difficulty in controlling the balance between a constraining force of a spring for preventing incorrect opening of sectors and a constraining force of a spring for opening the sectors. In particular, when the sectors are opened at a low speed, the difficulty in controlling the balance becomes marked. Even a minor mechanical difference leads to unstableness in a sector opening speed. As described in the Japanese Unexamined Utility Model Publication No. 2-55224, when a shutter mechanism is designed to be stowed entirely in a lens frame, it becomes hard to design the lens frame compactly. Consequently, a camera body itself becomes large in size. According to the structure in which a pin is fitted in order to prevent incorrect opening of sectors, the number of parts increases and an extra space becomes necessary.

For example, Japanese Unexamined Utility Model Publication No. 59-27532 relates to a camera shutter comprising a first sector drive ring member that, when rotated by means of a drive spring force, allows sectors to open, a second sector drive ring member that, when rotated by means of a drive spring force in the same direction in which the first sector drive ring member rotates, allows the sectors to close, and first and second electromagnetic devices for rotating the first and second sector drive ring members resistively to the drive spring forces, attracting and retaining the first and second sector drive ring members at set positions allowing the sectors to remain closed, and freeing -the first and second sector drive ring members when actuated. While the first sector drive ring member alone is rotating by means of the drive spring force, the sectors open. When the second sector drive ring member rotates by means of the drive spring force, the sectors close. Disclosed in the last-mentioned utility model publication is a bound prevention device for a camera shutter, comprising a spindle resting on a first setting member for pushing the sector drive ring members to the set positions, a bound prevention lever for immobilizing the sector drive ring members when the camera shutter is at a halt, and a release member that rests on a second setting member, which drives the first setting member so that the first setting member pushes the sector drive ring members to the set positions, as part of the second setting member, and that, after the pushing is started, interlocks with the bound prevention lever so as to free the sector drive ring members. According to a technological means described in the last-mentioned utility model publication, a close ring for closing the sectors is caught between a shutter board and the bound prevention lever resting on the shutter board. Thus, the sectors are prevented from reopening. Release of the bound prevention lever for setting is achieved using a cam.

However, the Japanese Unexamined Utility Model Publication No. 59-27532 poses a problem in that the mechanism is complex and large in size because a special structure such as the cam is needed to release bound prevention after bound prevention is effected.

OBJECTS AND SUMMARY OF THE INVENTION

A first object of the present invention is to provide a camera having a lens shutter mechanism capable of changing aperture speeds.

A second object of the present invention is to provide a camera having a lens shutter mechanism applicable to a collapsible lens frame.

A third object of the present invention is to provide a camera having a lens shutter mechanism capable of preventing incorrect opening of a shutter means.

A fourth object of the present invention is to provide a small-sized lens shutter mechanism capable of preventing a bound from occurring when a shutter means forms a predetermined exposure aperture.

A fifth object of the present invention is to provide a camera having a lens shutter mechanism capable of offering stable shutter speeds despite a simple structure and changing the shutter speeds.

A sixth object of the present invention is to provide a lens shutter mechanism permitting realization of a small-sized lens frame and a compact camera body and being applicable to a collapsible lens frame.

A seventh object of the present invention is to provide a camera having a lens shutter mechanism that can prevent incorrect opening of a shutter means but is neither larger in size nor makes low speeds of opening the shutter means unstable.

Briefly, a camera having a lens shutter mechanism in accordance with the present invention comprises a shutter means for forming a predetermined exposure aperture, a shutter driving means for allowing the shutter means to open, an aperture speed selecting means for selecting an aperture speed, and an aperture speed changing means that interlocks with the aperture speed selecting means so as to drive the shutter driving means and that has a plurality of lever means constrained to move in the same direction by a plurality of elastic means.

These as well as other objects and advantages of the present invention will be further apparent from the detailed description below.

DETAILED DESCRIPTION OF THE PREFERRED EMBODIMENTS

Figure 1:
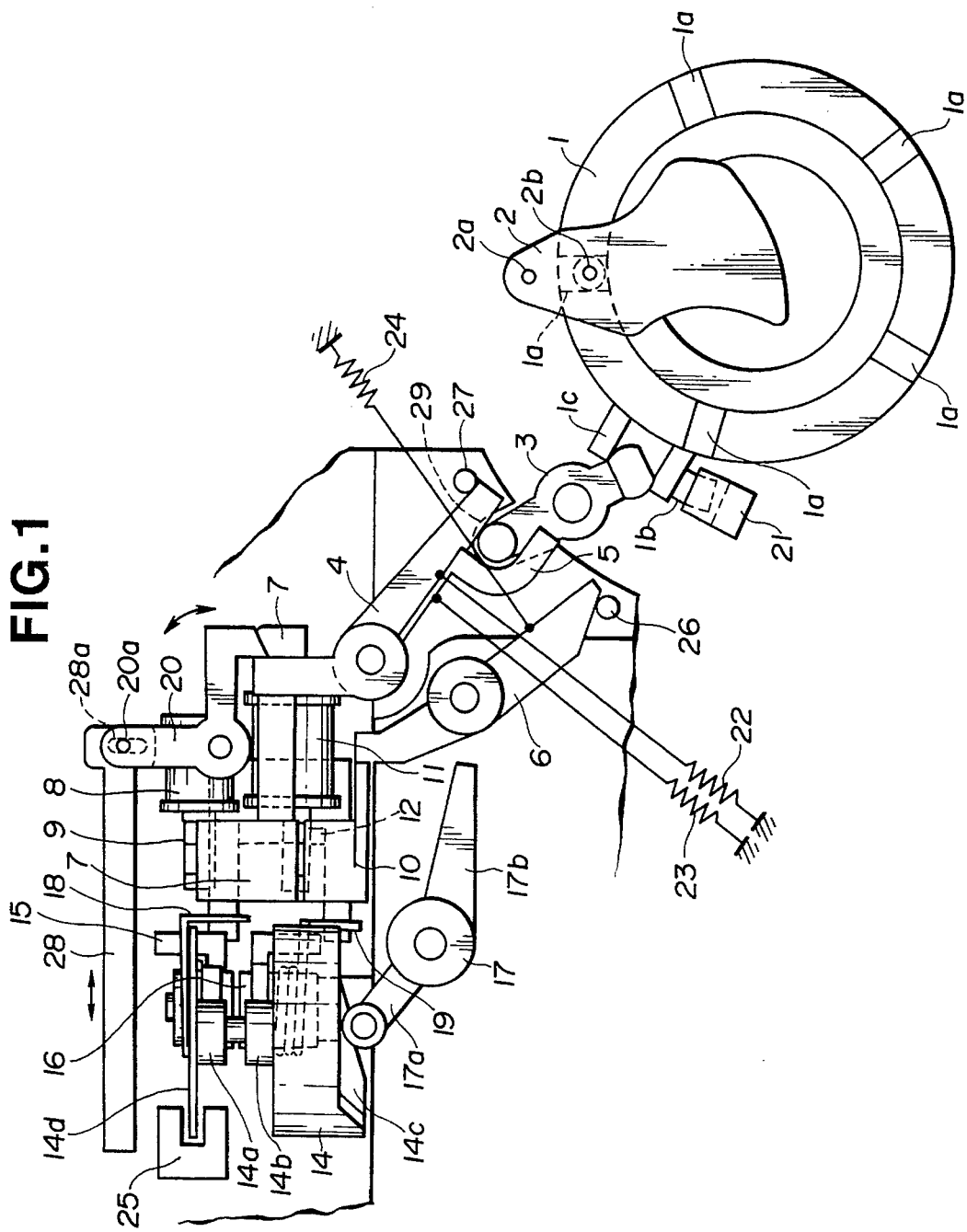
FIG. 1 is a front view showing a lens shutter mechanism of the first embodiment of the present invention.

Referring to the drawings, embodiments of the present invention will be described below.

Figure 2:
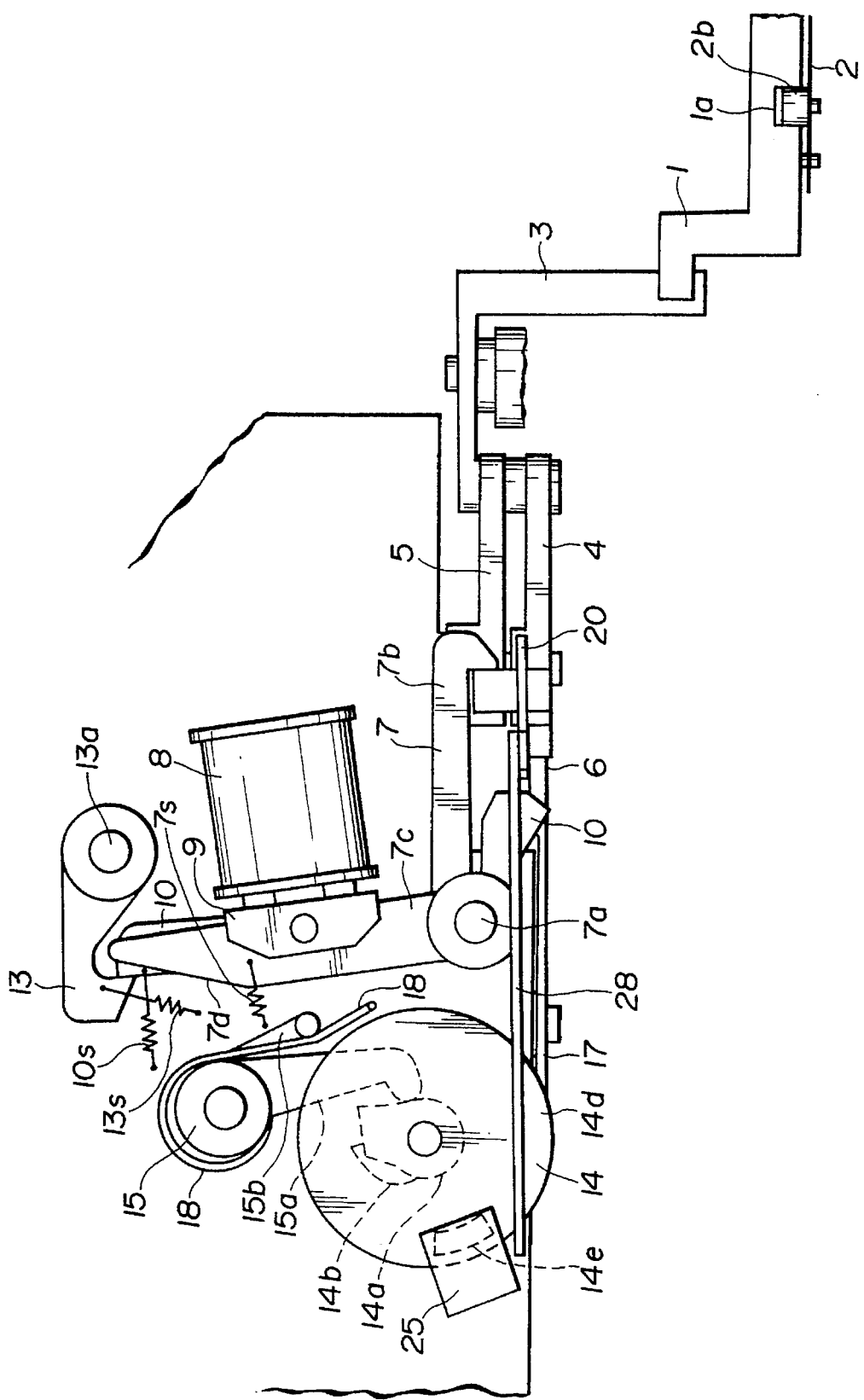
FIG. 2 is a plan view showing the lens shutter mechanism of the first embodiment.

FIGS. 1 and 2 are a front view and a plan view showing a lens shutter mechanism of the first embodiment of the present invention that is placed in a set state and ready to make a movement for release.

In the lens shutter mechanism, sectors 2 are disposed in a lens frame and a drive mechanism for conveying a driving force to the sectors is arranged three-dimensionally above a spool chamber.

To begin with, the sectors lying in the lens frame and members surrounding the sectors will be described.

A drive ring 1 serving as a rotary member and a shutter driving means is locked in the inner diameter of a lens frame that is not shown. While being restrained from thrusting by a first presser that is not shown, the drive ring 1 can rotate in a circumferential direction. In the drive ring 1, a sector fitting ditch 1a extending in a radial direction is bored at every one-fifth position along the circumference of the drive ring 1. An engagement section 1c that engages with an interlock lever 3, which will be described later, protrudes from the outer circumference of the drive ring 1. A fin 1b is formed on a side of the engagement section 1c in harmony with the outer circumference of the drive ring 1. The fin 1b assists a first photo-interrupter 21 mounted on the lens frame in detecting that the sectors 2 have started opening.

The interlock lever 3 serving as a conveying member engages with a drive mechanism and the drive ring 1 so as to convey a driving force exerted by the drive mechanism to the drive ring 1. The interlock lever 3 is mounted on a back end of the lens frame along the optical axis.

A plurality of sectors 2 serving as a shutter means are attached to the drive ring 1. In this embodiment, the number of sectors 2 is five proportionally to the number of sector fitting ditches 1a on the drive ring 1. It is understood that the number of sectors is not limited to five. In FIG. 1, only one sector 2 is shown purposes of simplicity.

The sectors 2 cooperate with one another so as to pass a beam of light or intercept the beam. Depending on the magnitude or time of driving the sectors, an exposure value or an f-number are controlled. The sectors 2 are restrained from thrusting by means of a second presser that is not shown. Each sector 2 has a rotation center hole 2a, and is supported by an axis protruding along the optical axis from the lens frame through the rotation center hole 2a. In the vicinity of the rotation center hole 2a toward the center of the drive ring through which the optical axis runs, a sector dowel 2b allowing the sector 2 to turn is attached in a caulked state. The sector dowel 2b is fitted into the sector fitting ditch 1a in the drive ring 1 through a hole, which is not shown, bored in the first presser.

Next, a drive mechanism for driving the sectors will be described.

The drive mechanism is, as mentioned above, mostly arranged three-dimensionally above the spool chamber. For interlocking with the interlock lever 3 mounted on the back end of the lens frame, part of the drive mechanism is arranged in front of the spool chamber. Disposed in front of the spool chamber are a high-speed sector opening lever 4 and a low-speed sector opening lever 5 that serve as an opening means for opening the sectors 2 by engaging with the interlock lever 3 and also serve as a shutter speed changing means, and a sector closing lever 6 serving as a closing means for closing the sectors 2 by engaging with the interlock lever 3.

Each of the high-speed sector opening lever 4, low-speed sector opening lever 5, and sector closing lever 6 includes, as shown in FIG. 1, a spring. A spring 22 attached to the high-speed sector opening lever 4 is used to open the sectors at a high speed, which spring 22 exerts a rather strong constraining force. A spring 23 attached to the low-speed sector opening lever 5 is used to open the sectors at a low speed and to produce a triangular wave for programming, which spring 23 exerts a rather weak constraining force. These springs 22 and 23 constrain the respective members to move in a direction (clockwise in FIG. 1) causing the sectors 2 to open. On the other hand, the sector closing lever 6 has a spring 24 for constraining the sector closing lever 6 to move in a direction (counterclockwise in FIG. 1) causing the sectors 2 to close. Due to the constraining force of the spring 24, the sectors close, and the high-speed sector opening lever 4 and low-speed opening lever 5 resist against the constraining forces of the springs 22 and 23. Thus, the spring 24 exerts a strong constraining force.

A second stopper 27 protrudes from a camera body and lies on a trajectory drawn by the turning sector opening levers 4 and 5. The second stopper 27 restrains the sector opening levers 4 and 5 from turning counterclockwise in FIG. 1. A first stopper 26 protrudes from the camera body and lies on a trajectory drawn by the turning sector closing lever 6. The first stopper 26 restrains the sector closing lever 6 from turning clockwise in FIG. 1.

When the sectors are charged, the sector opening levers 4 and 5 are immobilized by an opening stoppage member 7. The opening stoppage member 7 is a lever member shaped substantially like a letter L, which turns about an axis 7a while being constrained to move counterclockwise in FIG. 2 by means of a spring 7s. The distal portion of one arm 7b is shaped like a hook, thus immobilizing the sector opening levers 4 and 5. The other arm 7c of the opening stoppage member 7 has a first magnet receptor 9 that is attracted by a first magnet 8. The distal edge of the arm 7c is formed as a slope 7d.

The first magnet 8 is an on-type trigger magnet. When the first magnet 8 is nonconducting, the first magnet receptor 9 is attracted by a permanent magnet in the first magnet 8 and thereby retaining the opening stoppage member 7. When the first magnet 8 is conducting, the attraction is released.

Among the two sector opening levers 4 and 5, the high-speed sector opening lever 4 is immobilized by a high-speed opening stoppage member 20. The high-speed opening stoppage member 20 is a lever member shaped substantially like a letter L. When caught by a hook formed as the distal portion of one arm of the high-speed opening stoppage member 20, even if freed by the opening stoppage member 7, the high-speed sector opening lever 4 is immobilized. A boss 20a protrudes from the other arm of the high-speed opening stoppage member 20. When the boss 20 is fitted into an elongated hole 28a bored in the distal end of a mode changing member 28 serving as a shutter speed selecting means, the high-speed opening stoppage member 20 is turned by the mode changing member 28.

The sector closing lever 6 is immobilized by a first closing stoppage member 10 that immobilizes the sector opening lever 6 when the sectors are charged. The first closing stoppage member 10 is a lever member shaped substantially like a letter L, and having a pivot which is substantially coaxial with the pivot of opening stoppage member 7. The first closing stoppage member 10 is constrained to move counterclockwise in FIG. 2 by means of a spring 10s. One arm of the first closing stoppage member 10 immobilizes the sector closing lever 6. The other arm thereof has a second magnet receptor 12 having the same structure as the first magnet receptor 9 and serving as a member to be attracted by a second magnet 11.

The second magnet 11 is an off-type trigger magnet. When conducting, the second magnet 11 attracts the first closing stoppage member 10 and retains it.

Being an off-type trigger magnet, when nonconducting, the second magnet 11 does not retain the first closing stoppage member 10. A second closing stoppage member 13 is therefore disposed near the distal end of the other arm of the first closing stoppage member 10. The second closing stoppage member 13 is an arm member whose distal portion is shaped like a hook. The second closing stoppage member 13 can turn about an axis 13a, and is always constrained to move in a direction causing the hook-like distal portion thereof to immobilize and retain the first closing stoppage member 10 by means of a spring 13s.

On the left hand of the opening stoppage member 7 and first closing stoppage member 10 in FIGS. 1 and 2, a charge cam gear 14 serving as an initial position resetting means and having a plurality of cams is installed as a mechanism for charging the sectors after releasing is completed and thus placing the sectors in a set state enabling exposure. The charge cam gear 14 is rotated by conveying a driving force of a motor, which is not shown, via a gear array. From the top to the bottom in FIG. 1, a first cam 14a formed along a circumference of a first small-diameter section, a second cam 14b formed along a circumference of a second small-diameter section, and a third cam 14c formed on the bottom of a large-diameter section are arranged in that order.

A first charge member 15 for charging the opening stoppage member 7 is constrained to abut on the first cam 14a by means of a spring that is not shown. The first charge member 15 has an arm 15a that abuts on the first cam 14a, and also has a spring stoppage arm 15b. The spring stoppage arm 15b is provided with a spring 18 that is charged. The distal end of the spring 18 pushes the opening stoppage member 7, whereby the spring 7s is charged. Overcharge applied to the spring 7s is absorbed by the spring 18.

A second charge member 16 for charging the first closing stoppage member 10 is constrained to abut on the second cam 14b by means of a spring that is not shown. The second charge member has substantially the same structure as the first charge member 15. A spring 19 that is charged is attached to the second charge member 16. The distal end of the spring 19 pushes the first closing stoppage member 10, whereby the spring 10s is charged. Overcharge applied to the spring is absorbed by the spring 19.

A third charge member 17 for charging the sector closing lever 6 is constrained to abut on the third cam 14c by means of a spring that is not shown. The third charge member 17 is a lever member having an arm 17a that abuts on the third cam 14c and an arm 17b that presses the sector closing lever 6 so as to cause the sector closing lever 6 to make a turn.

The charge cam gear 14 has a thin flange 14d. The flange 14d has a hole 14e. Through the hole 14e, a second photo-interrupter 25 detects completion of charging.

Next, the operation of the embodiment having the aforesaid structure will be described.

Figure 3:
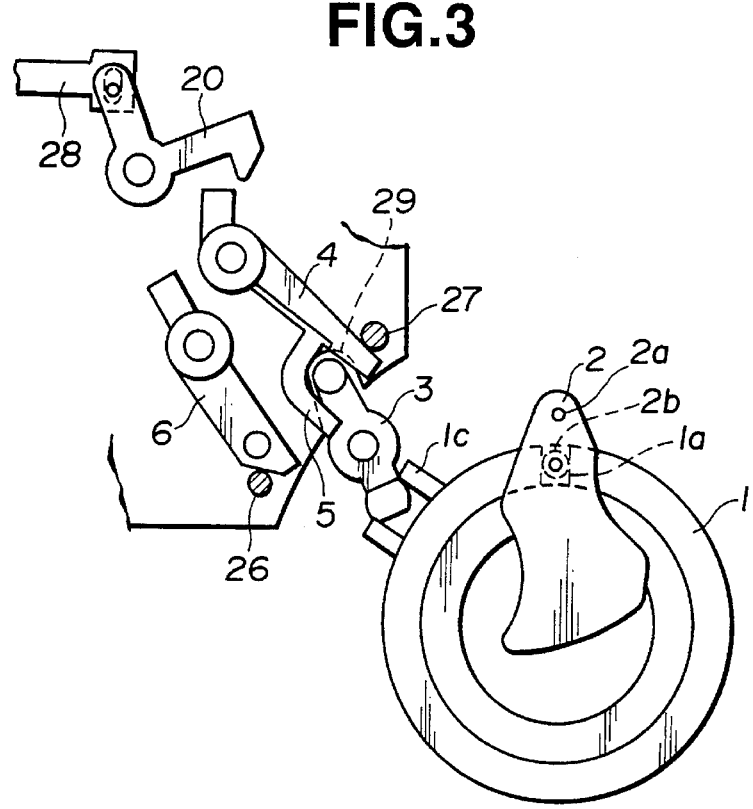
FIG. 3 is a front view showing a major portion of the lens shutter mechanism of the first embodiment placed in a set state.

When a release switch, which is not shown, resting on a camera is pressed, a control circuit that is not shown causes the second magnet 11 to conduct. The first closing stoppage member 10 immobilized by the second closing stoppage member 13 is therefore further attracted and retained. Thereafter, the first magnet 8 conducts. The opening stoppage member 7 is then freed and separated from the first magnet 8 by means of the constraining force of the spring 7s. The opening stoppage member 7 then turns counterclockwise in FIG. 2 and pushes against the second closing stoppage member 13 at the slope 7d of the other arm 7c thereof. The second closing stoppage member 13 therefore turns clockwise in FIG. 2 to free the first closing stoppage member 10. At this time, the first closing stoppage member 10 is still attracted and retained by the second magnet 11 (See FIG. 3).

Figure 4:
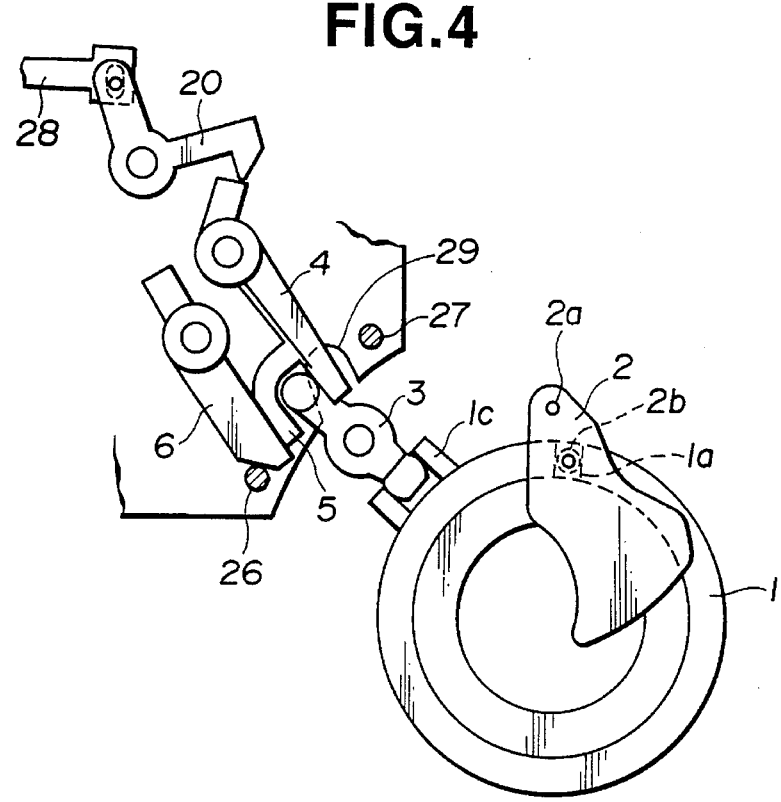
FIG. 4 is a front view showing the major portion of the lens shutter mechanism of the first embodiment in which high-speed sectors have started to open.

The opening stoppage member 7 turns counterclockwise in FIG. 2 so as to free the sector opening levers 4 and 5, and turns clockwise in FIG. 1 due to the constraining forces of the springs 22 and 23 attached to the sector opening levers 4 and 5 respectively. This causes the interlock lever 3 to rotate counterclockwise in FIG. 1, whereby the drive ring 1 rotates clockwise in FIG. 1. The dowels 2b of the sectors 2 then move, causing the sectors to pivot with the rotation center holes 2a as centers. Thus, an aperture enabling exposure is opened (See FIG. 4).

Meanwhile, the first photo-interrupter 21 detects the rotation of the drive ring 1 by sensing the motion of the fin 1b. When it is detected that the drive ring has moved to a position causing the sectors 2 to open, the control circuit that is not shown starts counting down in seconds.

Figure 5:
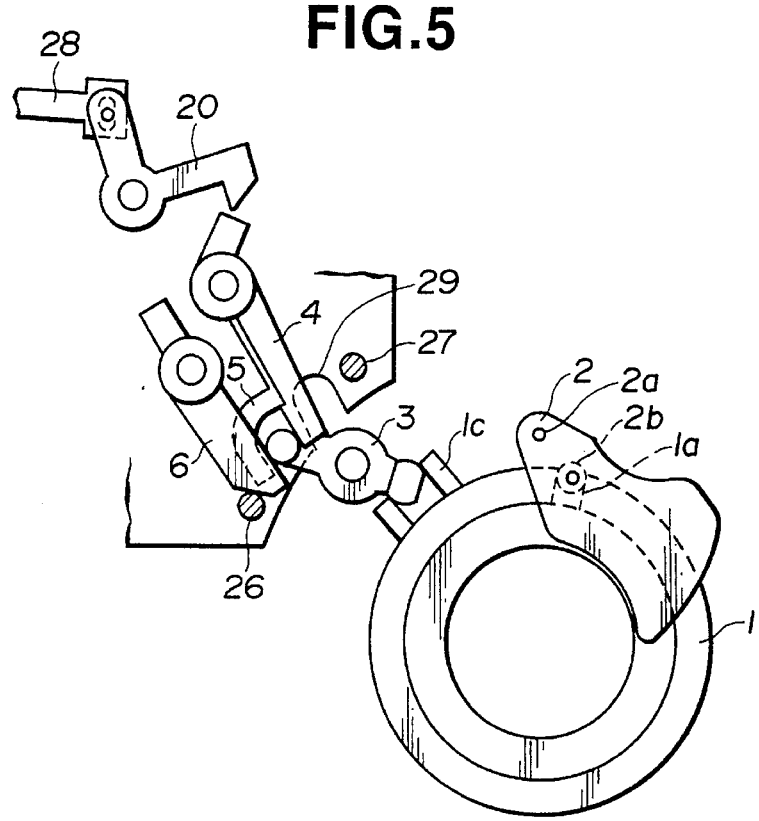
FIG. 5 is a front view showing the major portion of the lens shutter mechanism of the first embodiment in which the high-speed sectors are placed in a full open state.

The sector opening levers 4 and 5 turn until, as shown in FIG. 5, the interlock lever 3 abuts on the sector closing lever 6 and presses the sector closing lever 6 to move toward the first stopper 26, and then stop. In this state, the sectors 2 are full open.

After designated seconds have elapsed, the second magnet 11 is cut off so that the first closing stoppage member 10 is freed. The first closing stoppage member 10 then turns counterclockwise in FIG. 2 due to the constraining force of the spring 10s, thus freeing the sector closing lever 6. The sector closing lever 6 turns counterclockwise in FIG. I due to the constraining force of the spring 24, and causes the interlock lever 3 and drive ring 1 to close the sectors 2.

Figure 6:
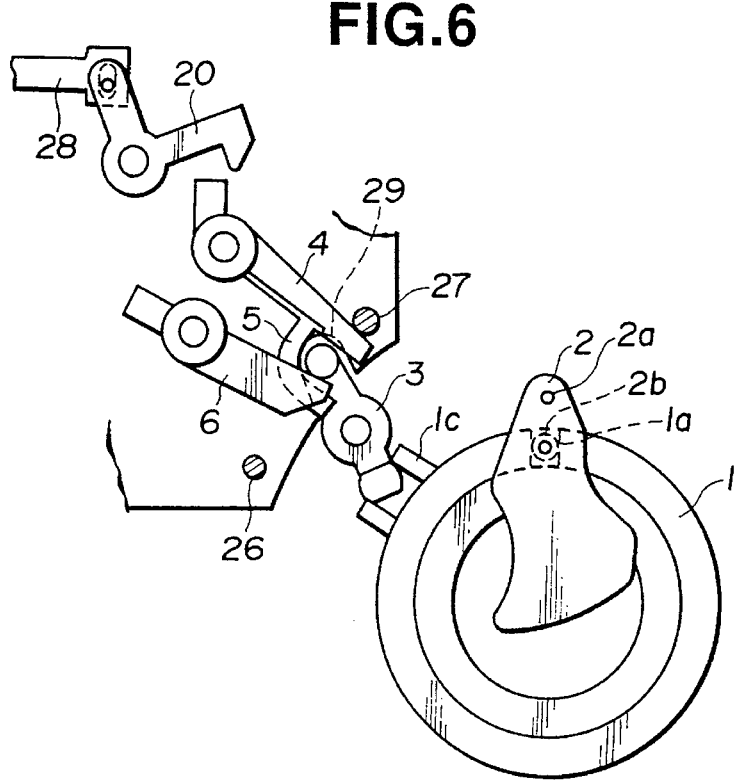
FIG. 6 a front view showing the major portion of the lens shutter mechanism of the first embodiment in which the sectors are placed in a full closed state.

While the sectors 2 are being closed, the sector opening levers 4 and 5 are pushed back by the constraining force of the spring 24 attached to the sector closing lever 6. The springs 22 and 23 attached to the sector opening levers 4 and 5 are then charged. When, as shown in FIG. 6, the sector opening levers 4 and 5 abut on the second stopper 27 and come to a halt, the sectors 2 are fully closed. The positions of the sector opening levers 4 and 5 in this state are referred to as set positions.

When the first photo-interrupter 21 detects that the sectors 2 are closed, the control circuit causes a motor that is not shown to conduct, and allows the charge cam gear 14 to rotate via a gear array. The first charge member 15 abutting on the first cam 14a turns counterclockwise in FIG. 2. This causes the spring 18 to press the opening stoppage member 7. The opening stoppage member 7 then turns clockwise in FIG. 2. Thus, the first charge member 15 charges the opening stoppage member 7. Next, the third charge member 17 abutting on the third cam 14c turns counterclockwise in FIG. 1 so as to turn the sector closing lever 6 clockwise in FIG. 1. Thus, the third charge member 17 charges the sector closing lever 6. Finally, the second charge member 16 abutting on the second cam 14b turns counterclockwise in FIG. 2 so as to cause the spring 19 to turn the first closing stoppage member 10 clockwise in FIG. 2. Thus, the second charge member 16 charges the first closing stoppage member 10. Specifically, the edge of the first closing stoppage member 10 presses the slope formed along the edge of the hook-like distal portion of the second closing stoppage member 13, and thus repels the constraining force of the spring 13s, and makes a turn. Finally, the first closing stoppage member 10 is immobilized by the second closing stoppage member 13.

As mentioned above, the charge members 15, 17, and 16 abutting on associated cams of the charge cam gear 14 charge the opening stoppage member 7, sector closing lever 6, and first closing stoppage member 10 in that order.

When the members have completed charge, the opening stoppage member 7 immobilizes the sector opening levers 4 and 5. At this time, the opening stoppage member 7 is retained by the permanent magnet in the first magnet 8 that is nonconducting. The first closing stoppage member 10 immobilizes the sector closing lever 6 while being immobilized and retained by the second closing stoppage member 13 (See FIGS. 1, 2, and 3).

When the second photo-interrupter 25 detects that the aforesaid charge sequence is completed, the control circuit that is not shown determines that charge is completed, and cuts off the motor. Thus, all movements are completed.

Next, a mechanism for preventing incorrect opening of sectors during collapse of a lens frame in this embodiment will be described.

Figure 9:
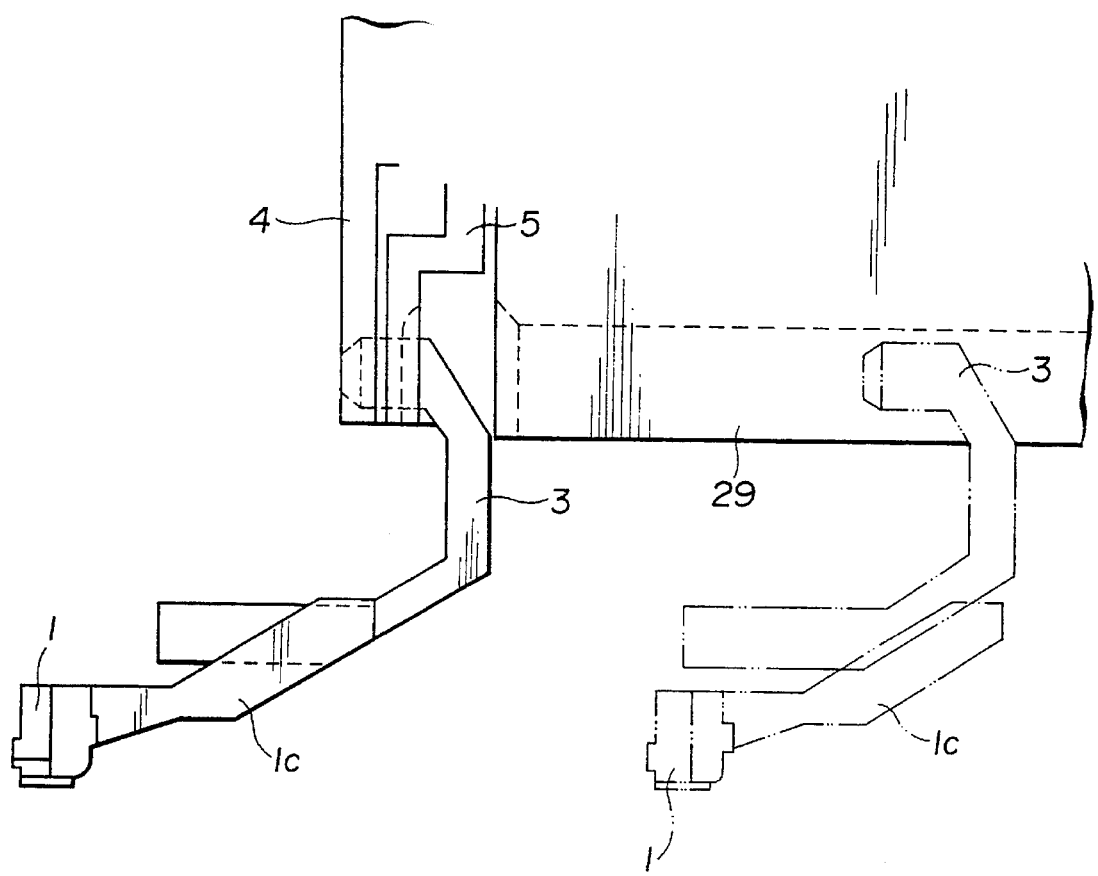
FIG. 9 is a side view showing the manner in which an interlock lever in the first embodiment shifts due to collapse of a lens frame.

FIG. 9 is a side view showing the manner in which the interlock lever 3 shifts due to collapse of a lens frame. The solid line indicates a position of the interlock lever 3 during photography. The alternate long and two short dashes line indicates a position of the interlock lever 3 during collapse of the lens frame.

During photography, the lens frame is thrust from the camera body. The high-speed sector opening lever 4, low-speed sector opening lever 5, and interlock lever 3 engage with one another. The sectors 2 are then opened and closed through the drive ring 1.

When the camera is unused, the lens frame is collapsed into the camera body. The interlock lever 3 mounted on the back end of the lens frame is disengaged from the high-speed sector opening lever 4 and low-speed sector opening lever 5, and fitted into a long groove 29, which is bored in the camera body and serves as a restraining means, along the optical axis. The interlock lever 3 can now shift along the optical axis, thus collapsing to stay at a deep end of the camera body along the optical axis. The interlock lever 3 is restrained from turning about the optical axis. The interlock lever 3 cannot now shift in directions permitting opening and closing of the sectors 2. The foregoing mechanism successfully prevents the sectors from opening unexpectedly during collapse of the lens frame. During the collapse, the interlock lever 3 and drive ring 1 engage with each other in the fashion shown in FIG. 9. In other words, the drive ring 1 retreats relative to the interlock lever along the optical axis.

Figure 10:
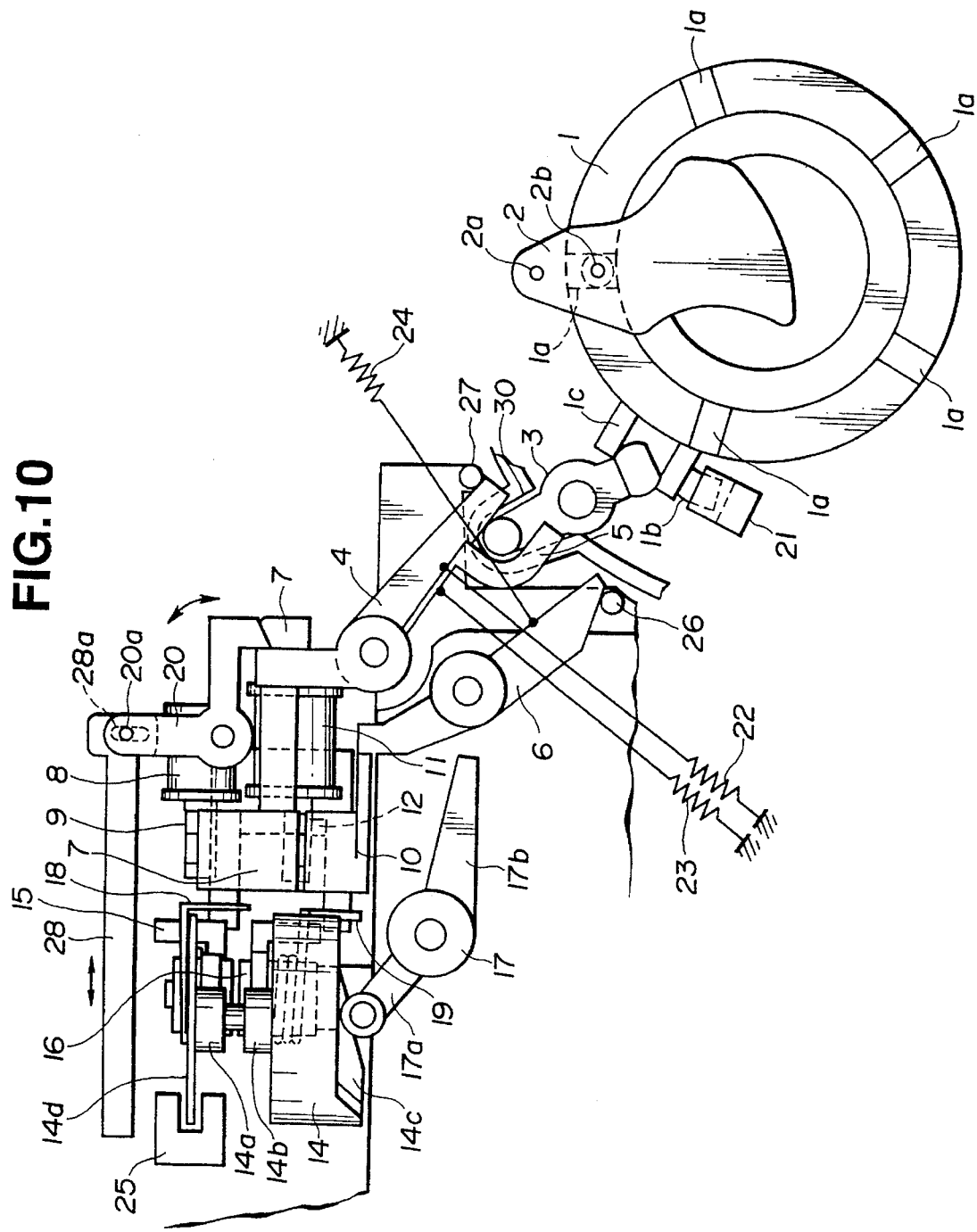
FIG. 10 is a front view showing the lens shutter mechanism of the first embodiment in which a long groove is bored along an optical axis in a lens frame securing member.
Figure 11:
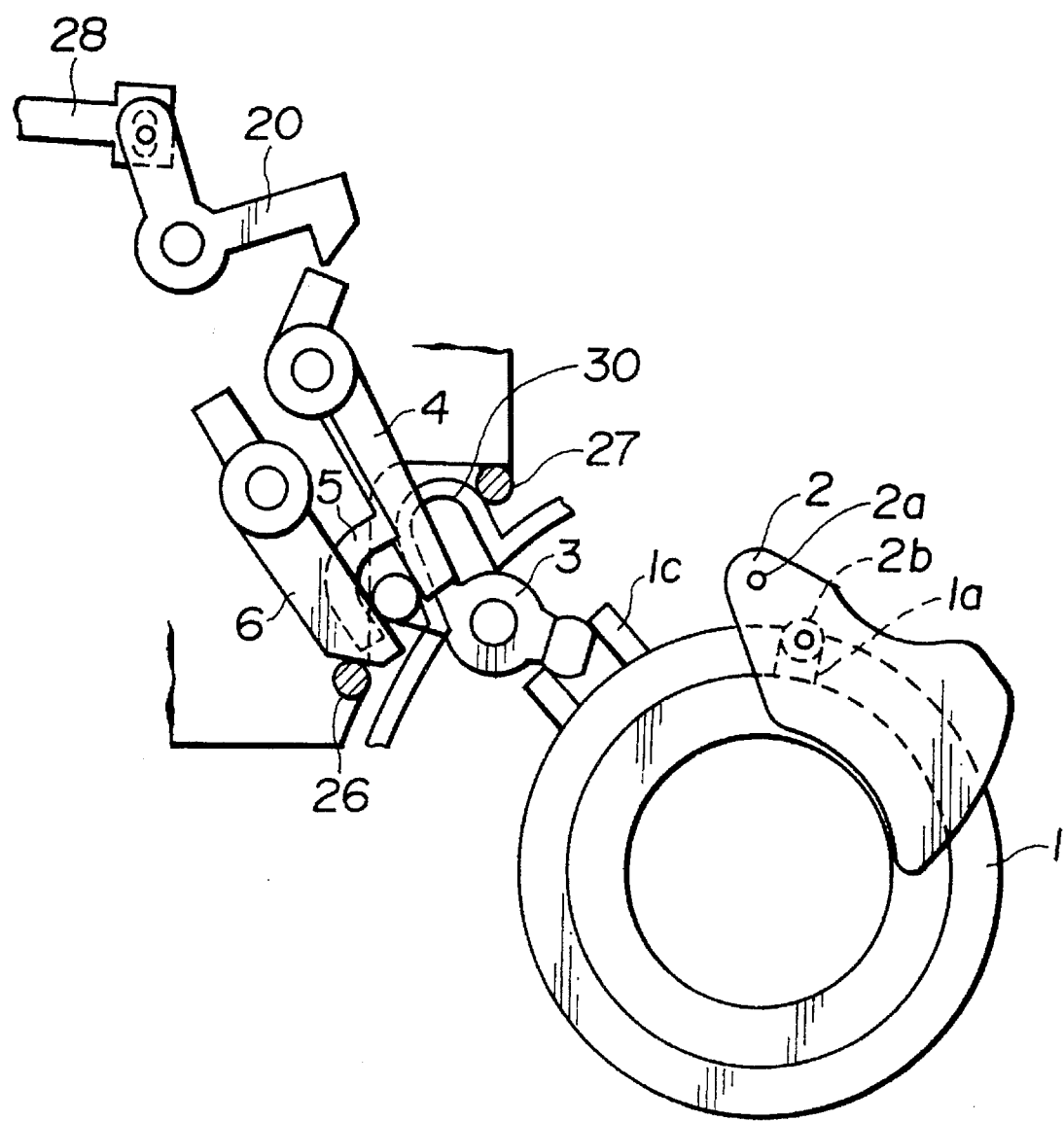
FIG. 11 is a front view showing the major portion of the lens shutter mechanism of the first embodiment in which the high-speed sectors are placed in the full open state and a long groove is bored along an optical axis in a lens frame securing member.
Figure 12:
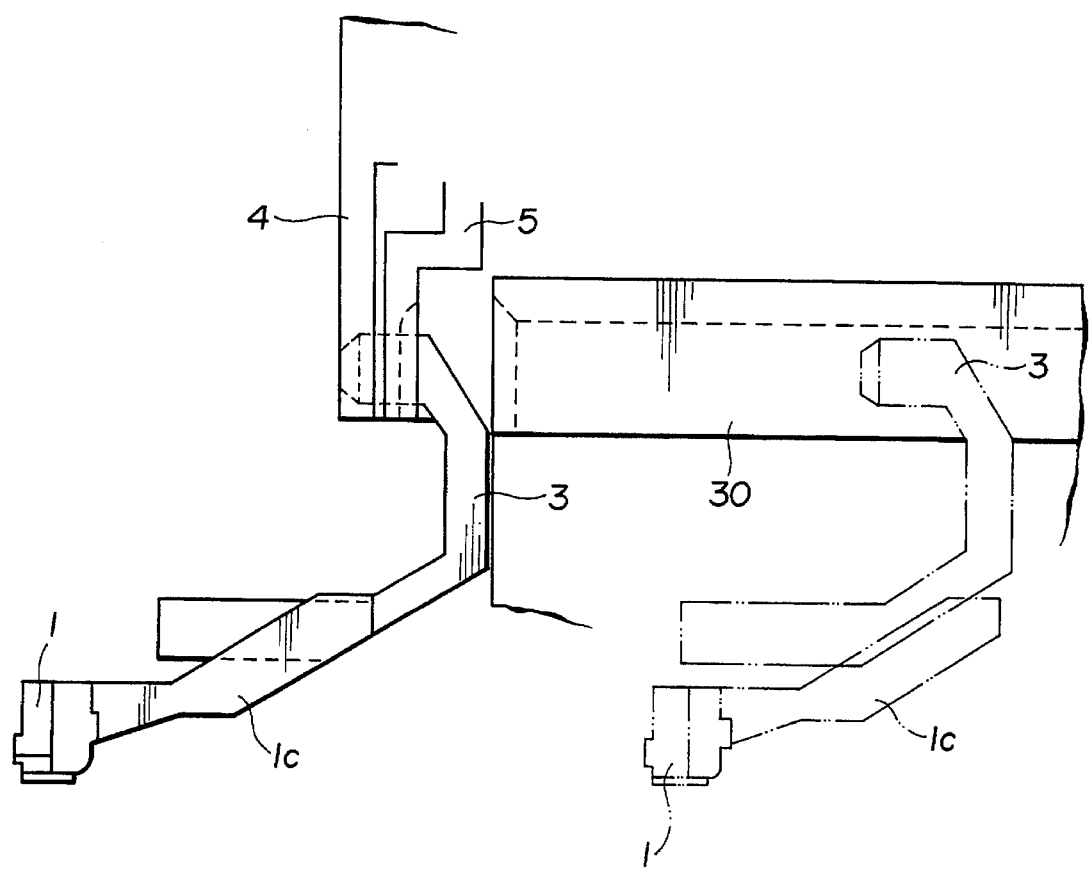
FIG. 12 is a side view showing the lens shutter mechanism of the first embodiment on the scene that because the lens frame collapses, the interlock lever shifts along the long groove bored along the optical axis in the lens frame securing member.

In the above mechanism, the groove 29 is bored in the camera body and used as a restraining means. Alternatively, as shown in FIGS. 10, 11, and 12, a long groove 30 may be bored along the optical axis in a lens frame securing member instead of the camera body. The interlock lever 3 is fitted into the groove 30 serving as the restraining means.

Next, how to change speeds of opening the sectors 2 in this embodiment will be described.

When the sectors 2 are opened at a high speed, the constraining forces of the strong spring 22 attached to the high-speed sector opening lever 4 and of the weak spring 23 attached to the low-speed sector opening lever 5 are used to move the two sector opening levers 4 and 5 simultaneously. The sectors 2 are then opened at a high speed through the interlock lever 3 and drive ring 1 (See FIGS. 3, 4, 5, and 6). Incidentally, the distal portion of the low-speed sector opening lever 5 is shaped for holding the engagement section of the interlock lever 3 at both sides of the engagement section. Owing to this shape, even during high-speed driving, the high-speed sector opening lever 4 and low-speed sector opening lever 5 are driven simultaneously by the constraining forces of the springs 22 and 23. It will therefore never happen that the high-speed sector opening lever 4 is driven independently.

Figure 7:
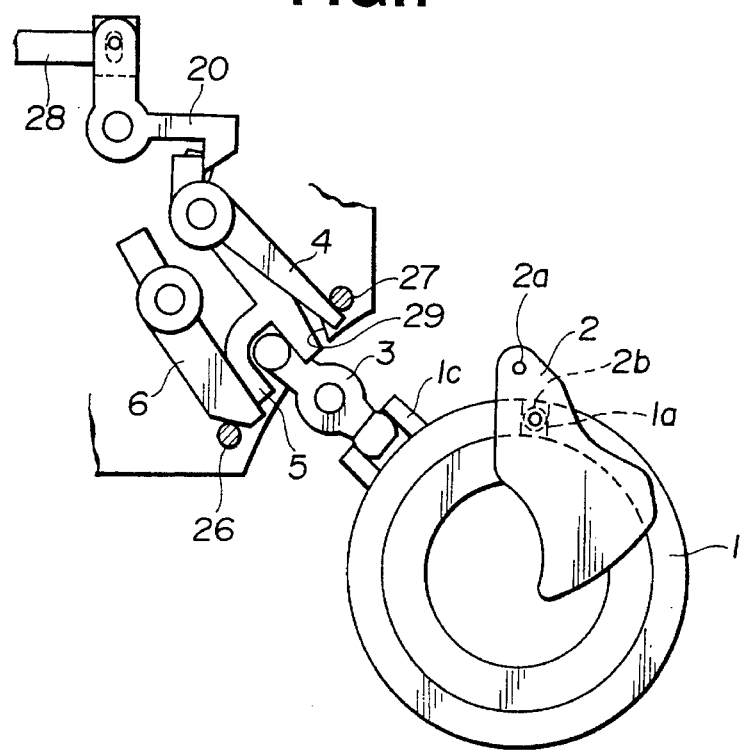
FIG. 7 is a front view showing the major portion of the lens shutter mechanism of the first embodiment in which the sectors have started opening at a low speed.
Figure 8:
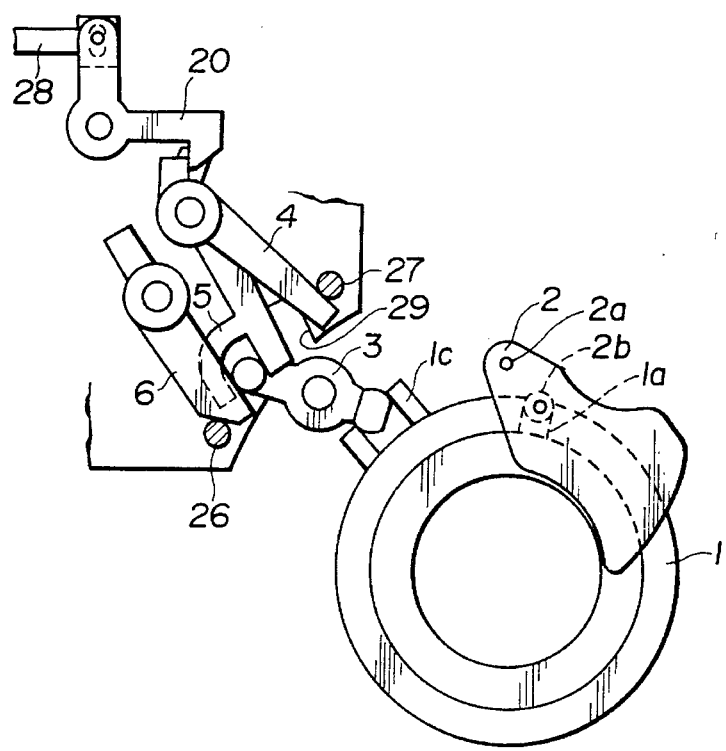
FIG. 8 is a front view showing the major portion of the lens shutter mechanism of the first embodiment in which the sectors that started opening at a low speed are now fully open.

Next, it will be discussed that the sectors 2 are opened at a low speed during programming or the like. The mode changing member 28 mounted in the camera body slides laterally in FIG. 1. This causes the high-speed opening stoppage member 20 to turn. The high-speed sector opening lever 4 alone is then immobilized. Consequently, since only the constraining force of the weak spring attached to the low-speed sector opening lever 5 works on, the sectors 2 open at a low speed (See FIGS. 7 and 8).

It has been described that for opening the sectors 2 at a high speed, the two sector opening levers 4 and 5 are moved simultaneously. Alternatively, the low-speed sector opening lever 5 may be immobilized, and the high-speed sector opening lever 4 alone may be moved in order to open the sectors 2 at a high speed. For this purpose, a low-speed sector opening lever having a shape shown in FIG. 13B, which will be described later, would be useful.

When three or more speeds of opening the sectors 2 are needed, three or more sector opening levers are installed so that modes associated to the levers can be changed. A programmable shutter may have therefore a plurality of modes; such as, a high-speed programming mode and a low-speed programming mode.

Figure 13A:
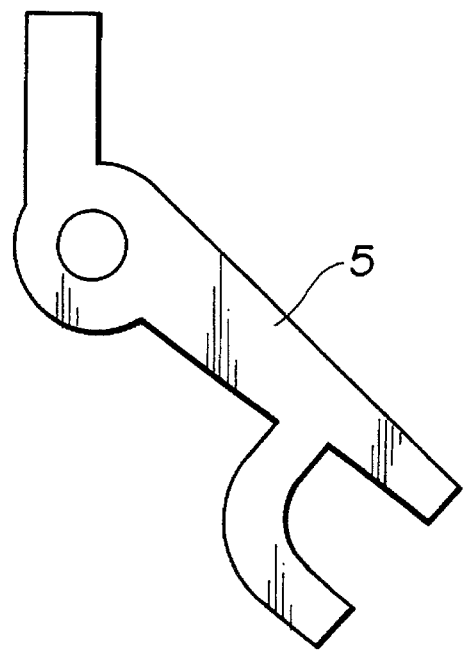
FIG. 13A is a front view showing an example of a shape of a low-speed sector opening lever in the first embodiment.
Figure 13B:
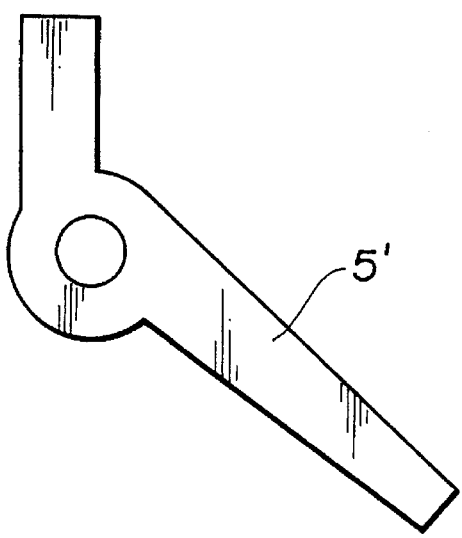
FIG. 13B is a front view showing another example of a shape of a low-speed sector opening lever in the first embodiment.

FIGS. 13A and 13B show shapes of the low-speed sector opening lever 5.

As shown in FIG. 13A, the portion of the low-speed sector opening lever 5 engaging with the interlock lever 3 bifurcates so as to have a shape permitting holding of the interlock lever 3 at opposing sides of the interlock lever 3. The shape helps prevent the sectors 2 from opening incorrectly.

FIG. 13B shows a variant of a low-speed sector opening lever.

A low-speed sector opening lever 5' is shaped substantially identically to the high-speed sector opening lever 4. For use of a low-speed sector opening lever having this shape, a spring or the like must be attached in order to constrain the sectors 2 to close. Otherwise, the sectors may open incorrectly.

Figure 14A:
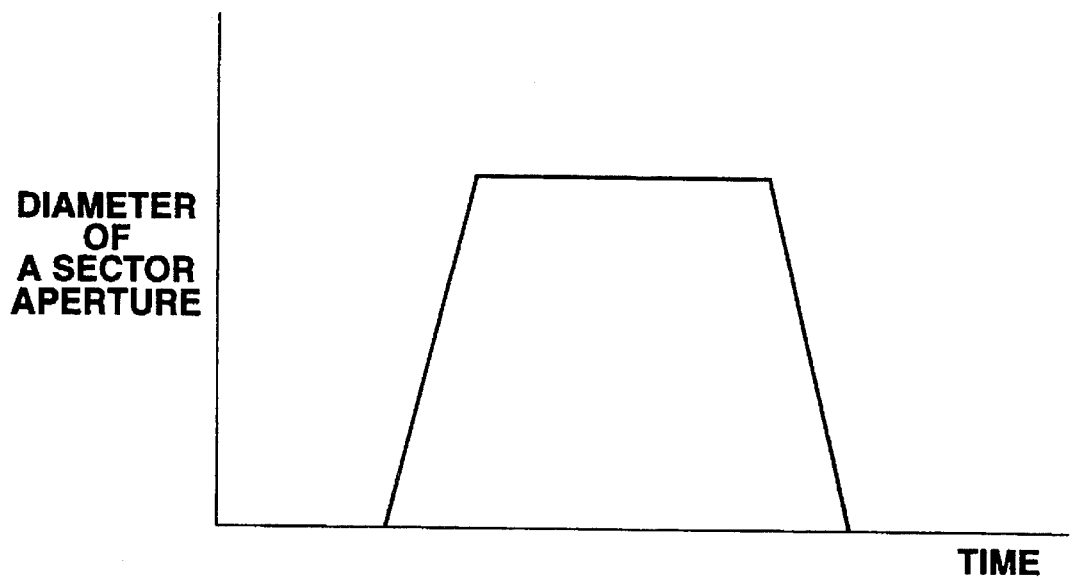
FIG. 14A shows the relationship between the diameter of a sector aperture and the exposure time to be born when the sectors in the first embodiment are opened at a high speed.
Figure 14B:
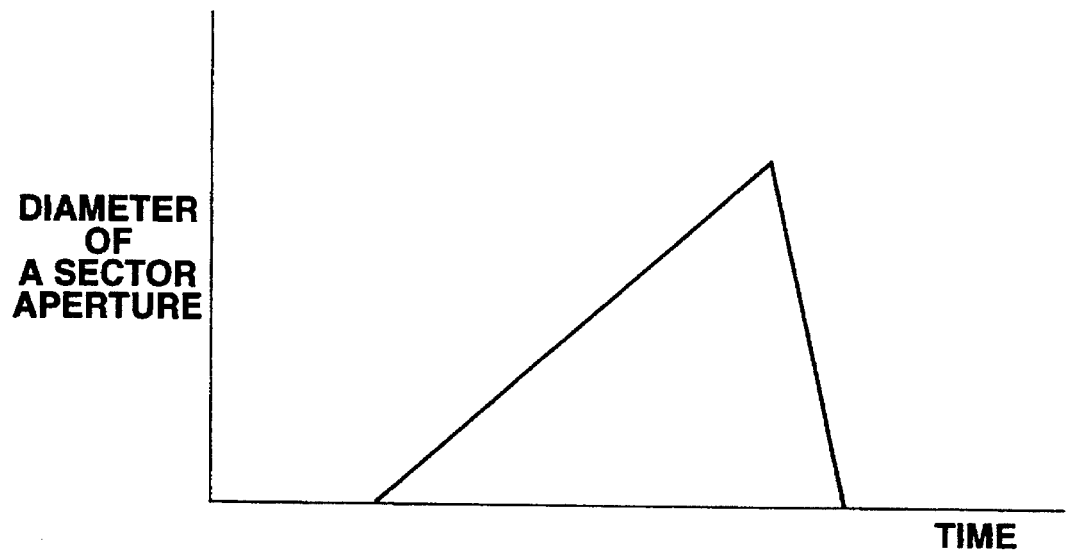
FIG. 14B shows the relationship between the diameter of a sector aperture and the exposure time to be born when the sectors in the first embodiment are opened at a low speed.

FIGS. 14A and 14B show the relationships between the diameter of an aperture provided by the sectors 2 and the exposure time.

FIG. 14A shows the relationship to be born when the sectors 2 are opened at a high speed. The line indicating a transition of a diameter of a sector aperture with the passing of time has a large inclination. This means that the sectors spend only a short period of time for opening, that the sectors remain open for a predetermined period of time, and that the sectors spend only a short period of time for closing. Thus, the relationship is plotted as a trapezoidal graph.

On the other hand, FIG. 14B shows the relationship to be born when the sectors 2 are opened at a low speed. Compared with FIG. 14A, the line indicating a transition of a diameter of a sector aperture with the passing of time has a smaller inclination. This means that the sectors spend a relatively long period of time for opening, and that the sectors close immediately after they open. Thus, the relationship is plotted as a triangular graph.

The shutter speed changing means including the high-speed sector opening lever 4 and low-speed sector opening lever 5 has been described as lying near and above a spool chamber in a camera body. Alternatively, the shutter speed changing means may be located near and below the spool chamber, or near above or below a Patrone chamber in which a Patrone is loaded.

Described next will be realization of a smaller-sized lens frame and a smaller-sized camera body.

It has been described that the sectors 2, the drive ring 1, the first presser and second presser that are not shown, and the interlock lever 3 mounted on the back end of a lens frame are disposed in the lens frame. Thus, when only a limited number of members are disposed in a lens frame, a small-sized lens frame can be realized.

A drive mechanism including the opening stoppage member 7, and a charge mechanism including the magnets 8 and 11, and charge cam gear 14 are arranged three-dimensionally above a spool chamber. Moreover, part of a drive mechanism such as the interlock lever 3 mounted on the back end of a lens frame, sector opening levers 4 and 5, and sector closing lever 6 is arranged in a limited space in front of the spool chamber. This results in a quite compact shutter mechanism. Consequently, a small-sized camera body is realized. Eventually, a totally compact camera can be designed.

FIGS. 15 to 20 show layouts of units in a camera.

Figure 15:
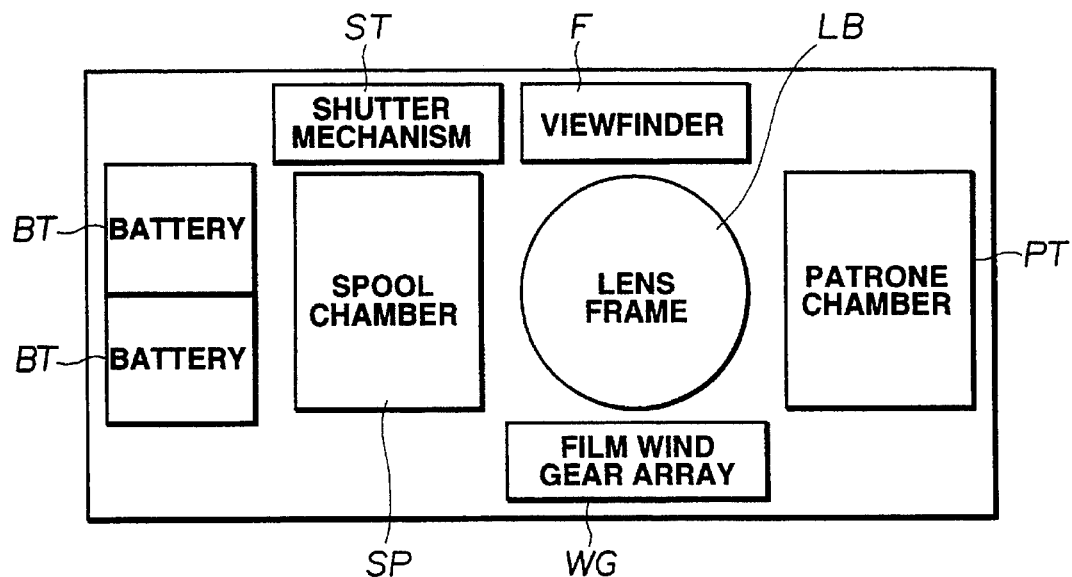
FIG. 15 is a front view showing an example of a layout in which the lens shutter mechanism of the first embodiment is incorporated in a camera.

FIG. 15 shows a layout in the aforesaid embodiment. As illustrated, a lens frame LB is located substantially in the center of a camera. A Patrone chamber PT is located on the right hand of the lens frame LB in FIG. 15, and a spool chamber SP is located on the left hand thereof. A viewfinder F is found above the lens frame LB, and a film wind gear array WG is found below it. Batteries BT are stowed on the left hand side of the spool chamber SP in FIG. 15. In this layout, a shutter mechanism ST is positioned neatly using a space above the spool chamber SP. The arrangement of a shutter mechanism shown in FIGS. 1 and 2 is applicable to the layout shown in FIG. 15. FIGS. 1 and 2 show the area above the spool chamber SP on an enlarged scale.

Figure 16:
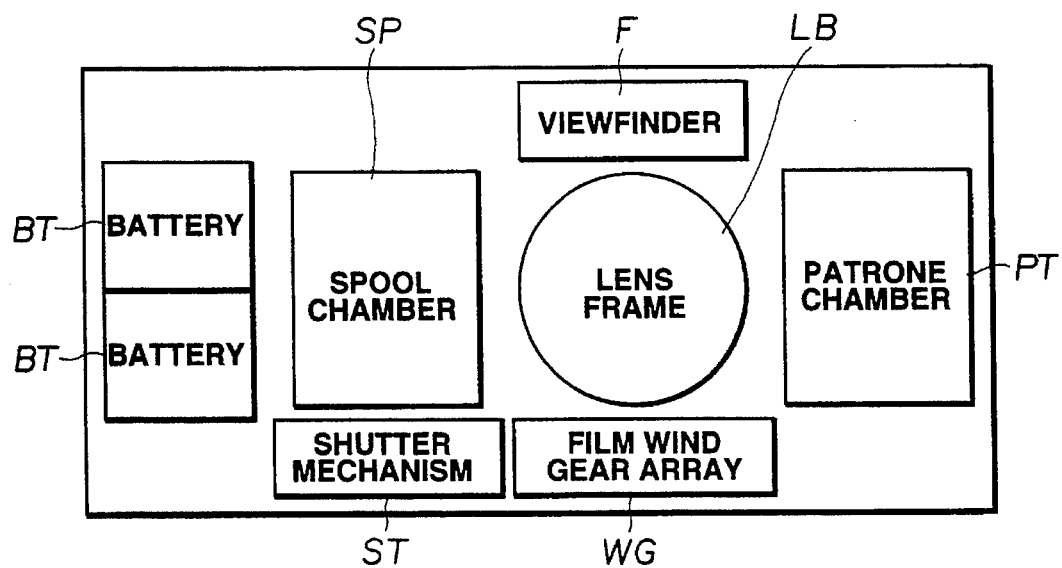
FIG. 16 is a front view showing the first variant of the layout in which the lens shutter mechanism of the first embodiment is incorporated in a camera.

FIG. 16 shows the first variant of the layout shown in FIG. 15. This layout is substantially identical to that shown in FIG. 15 except that the shutter mechanism ST is located below the spool chamber SP.

Figure 17:
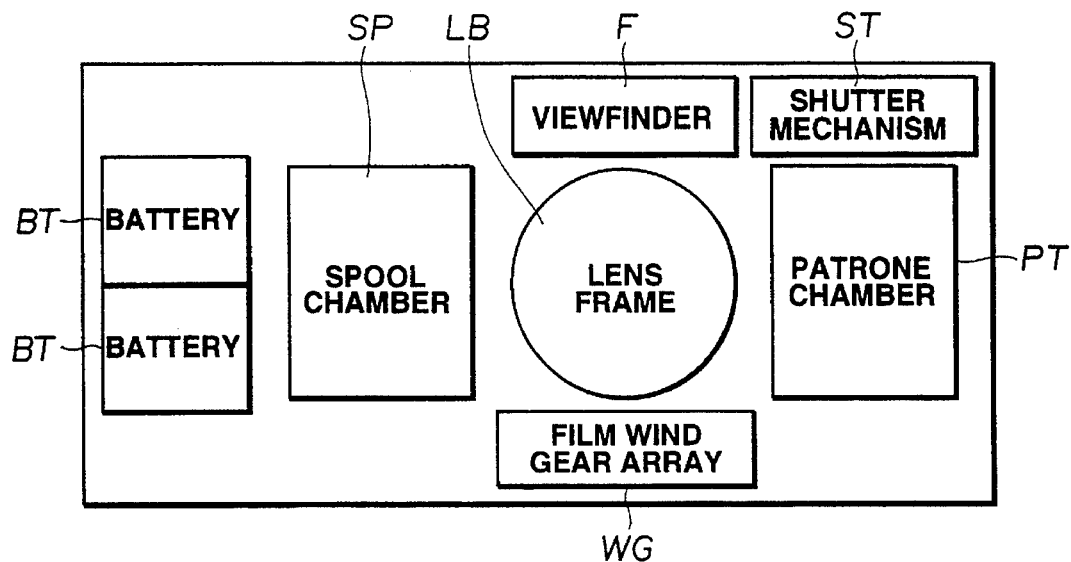
FIG. 17 is a front view showing the second variant of the layout in which the lens shutter mechanism of the first embodiment is incorporated in a camera.

FIG. 17 shows the second variant of the layout shown in FIG. 15. This layout is substantially identical to that shown in FIG. 15 except that the shutter mechanism ST is located above the Patrone chamber PT.

Figure 18:
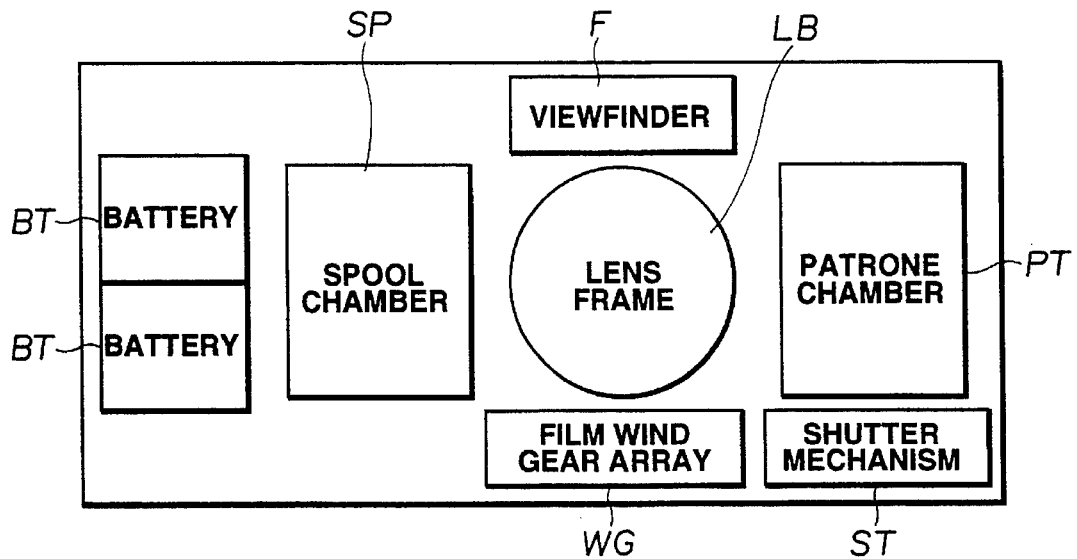
FIG. 18 is a front view showing the third variant of the layout in which the lens shutter mechanism of the first embodiment is incorporated in a camera.

FIG. 18 shows the third variant of the layout shown in FIG. 15. This layout is substantially identical to that shown in FIG. 15 except that the shutter mechanism ST is located below the Patrone chamber PT.

Figure 19:
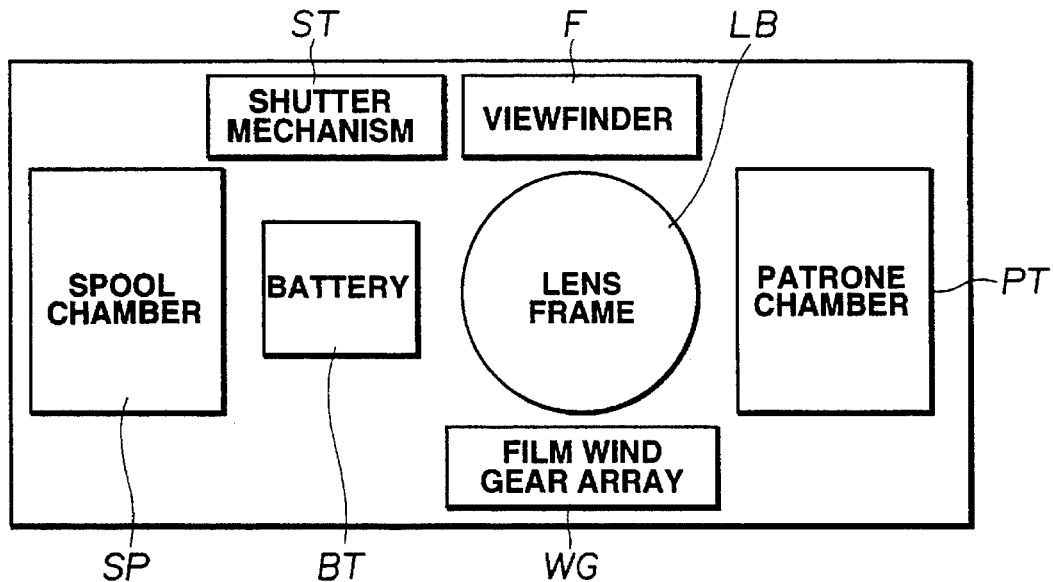
FIG. 19 is a front view showing the fourth variant of the layout in which the lens shutter mechanism of the first embodiment is incorporated in a camera.

FIG. 19 shows the fourth variant of the layout shown in FIG. 15. In FIG. 19, the spool chamber SP is located in the leftmost area in a camera body. Batteries BT are stowed on the right hand side of the spool chamber SP. In this layout, the shutter mechanism ST is located substantially above the batteries BT.

Figure 20:
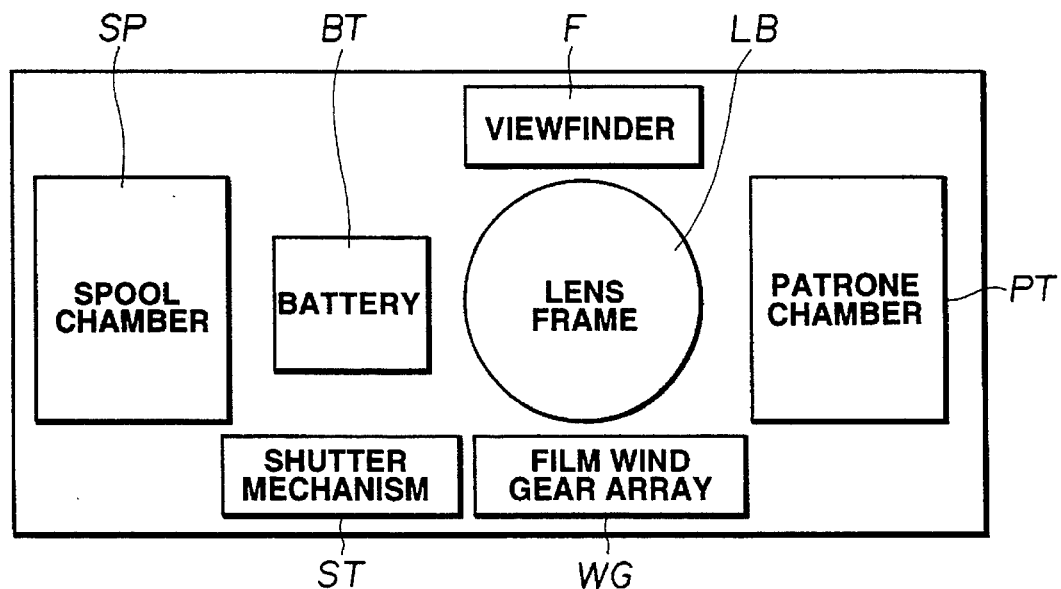
FIG. 20 is a front view showing the fifth variant of the layout in which the lens shutter mechanism of the first embodiment is incorporated in a camera.

FIG. 20 shows the fifth variant of the layout shown in FIG. 15. This layout is substantially identical to that shown in FIG. 19 except that the shutter mechanism ST is located substantially below the batteries BT.

In the aforesaid embodiment, a plurality (for example, five) of sectors are employed. These sectors are driven using a drive ring. When the number of sectors is two, the drive ring need not be used for opening and closing the sectors but an interlock lever or any other interlocking member may be used for directly opening and closing the sectors.

This embodiment has been described on the assumption that a shutter mechanism is based on constraining forces of springs. The present invention is not limited to this technique but will prove effective for a technique in which a plunger or the like is used to directly drive a shutter means or a technique in which a motor or the like is used to drive a shutter means.

According to the aforesaid first embodiment, spring forces are stable and therefore low and high speeds of opening sectors are stable. Moreover, since the sector opening speeds can be changed by manipulating a camera body, a programming mode, an aperture-priority mode, and a manual photography mode can be changed by manipulating the camera body. Only one switch is needed to change the modes. Furthermore, since levers are associated with speeds, inertia is limited. This enables high-speed opening of sectors. When sectors are designed to require small forces, high-speed opening can be realized.

This results in a lens shutter mechanism featuring that sector opening speeds can be changed despite a simple mechanism, that the opening speeds are stable, and that modes can be changed by manipulating a camera body.

According to the first embodiment, a mechanism for preventing incorrect opening is realized without any spring for constraining sectors to close. The employment of a mechanism for opening and closing sectors using spring forces permits a stable low speed of opening sectors.

There is no increase in the number of parts. Only members essentially required for forming an exposure aperture are disposed in a lens frame, and the other members of a shutter drive mechanism are placed in a camera body. Moreover, since springs for constraining sectors to close and a mechanism for preventing incorrect opening need not be arranged in the lens frame as mentioned above, the lens frame can be designed compactly. Eventually, an entire camera can be designed compactly.

Members placed outside a lens frame are arranged three-dimensionally in, for example, a space above a spool chamber in a camera body. A member for interlocking members in the lens frame is located in a small space in front of the spool chamber. Thus, a very compact shutter mechanism is realized. This results in a small-sized camera body. Eventually, a compact camera can be designed.

According to the aforesaid arrangement of a shutter mechanism, a base on which members to be located outside a lens frame are mounted is placed in a camera body. This arrangement is effective even for a type of camera in which, when a camera is unused, a lens frame is collapsed.

FIGS. 21 to 26 relate to the second embodiment of the present invention. In the second embodiment, components identical to those in the first embodiment are assigned the same reference numerals, of which description will be omitted. Only a major difference will be described.

The arm of the sector closing lever 6 near the interlock lever 3 is provided with a bound prevention arm 51. The bound prevention arm 51 turns freely in a permissible range defined by stoppers 6*a* and 6*b*, which restrict a range of rotation, with respect to a rotation center located on the sector opening lever 6. The bound prevention arm 51 has a slope 51*a* along a distal edge thereof and also has an engagement recess 51*b* for holding the interlock arm 3.

A bound prevention lever constraining spring 52 is coupled between the bound prevention arm 51 and sector opening lever 6. The spring 52 constrains the bound prevention arm 51 to abut on the stopper 6*b* (See FIG. 23).

The drive ring 1 in the second embodiment is constantly constrained to rotate in a direction causing the sectors to close (or counterclockwise in FIG. 21) by means of a ring constraining spring 53. When the shutter is not charged, film will not be exposed to light accidentally.

Next, the operation of the second embodiment will be described.

When a release switch, which is not shown, resting on a camera is pressed, a control circuit that is not shown causes the second magnet 11 to conduct. The first closing stoppage member 10 immobilized by the second closing stoppage member 13 is therefore further attracted and retained. Thereafter, when the first magnet 8 conducts, the opening stoppage member 7 is freed and separated from the first magnet by the constraining force of the spring. The opening stoppage member 7 then turns counterclockwise in FIG. 22 and pushes through the second closing stoppage member 13 using the slope 7*d* of the other arm 7*c* thereof. This causes the second closing stoppage member 13 to turn clockwise in FIG. 22. The first closing stoppage member 10 is therefore freed. At this time, the first closing stoppage member 10 is still attracted and retained by the second magnet 11 (See FIGS. 21 and 22).

Figure 21:
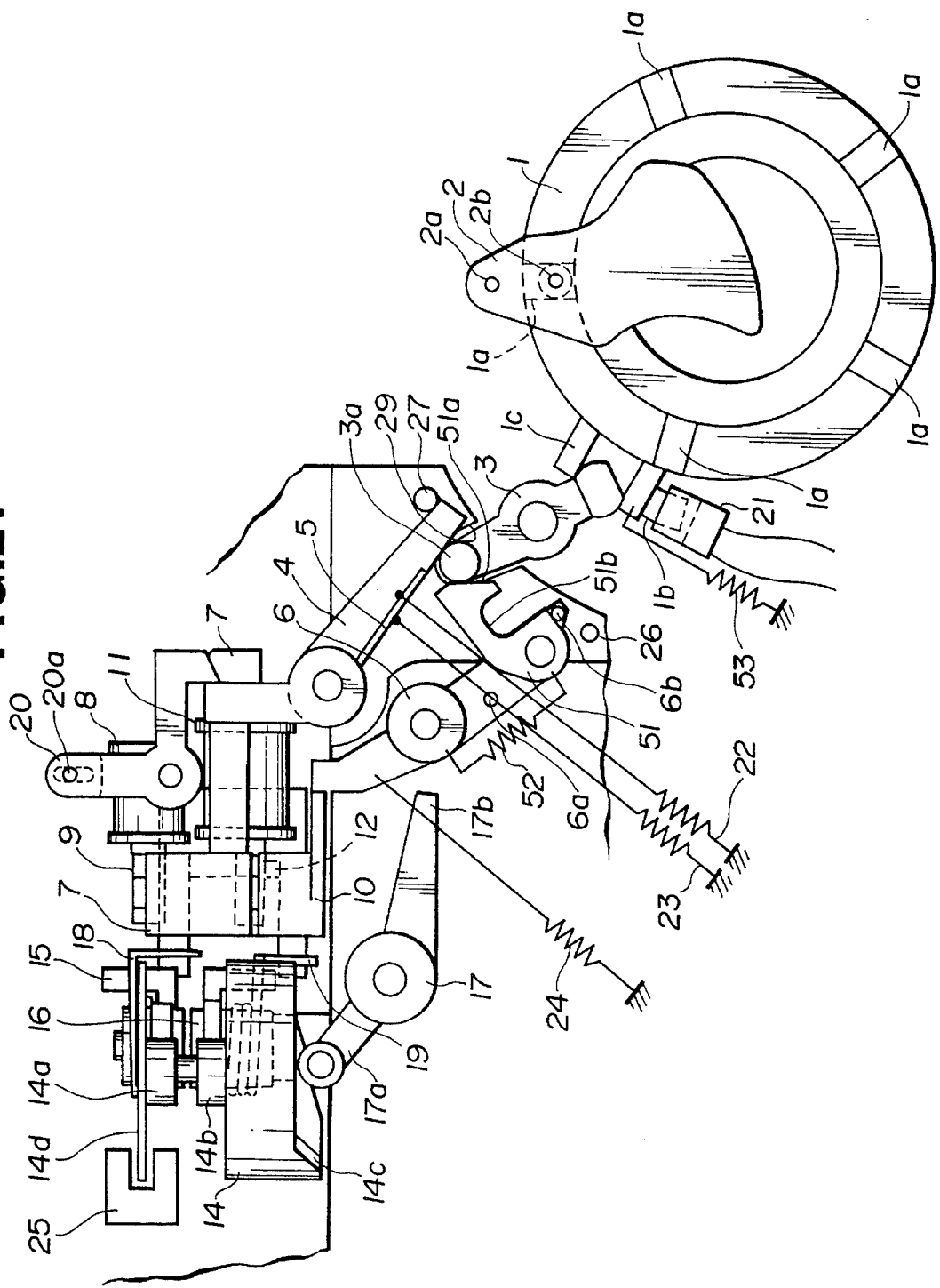
FIG. 21 is a front view showing a lens shutter mechanism of the second embodiment of the present invention.
Figure 22:
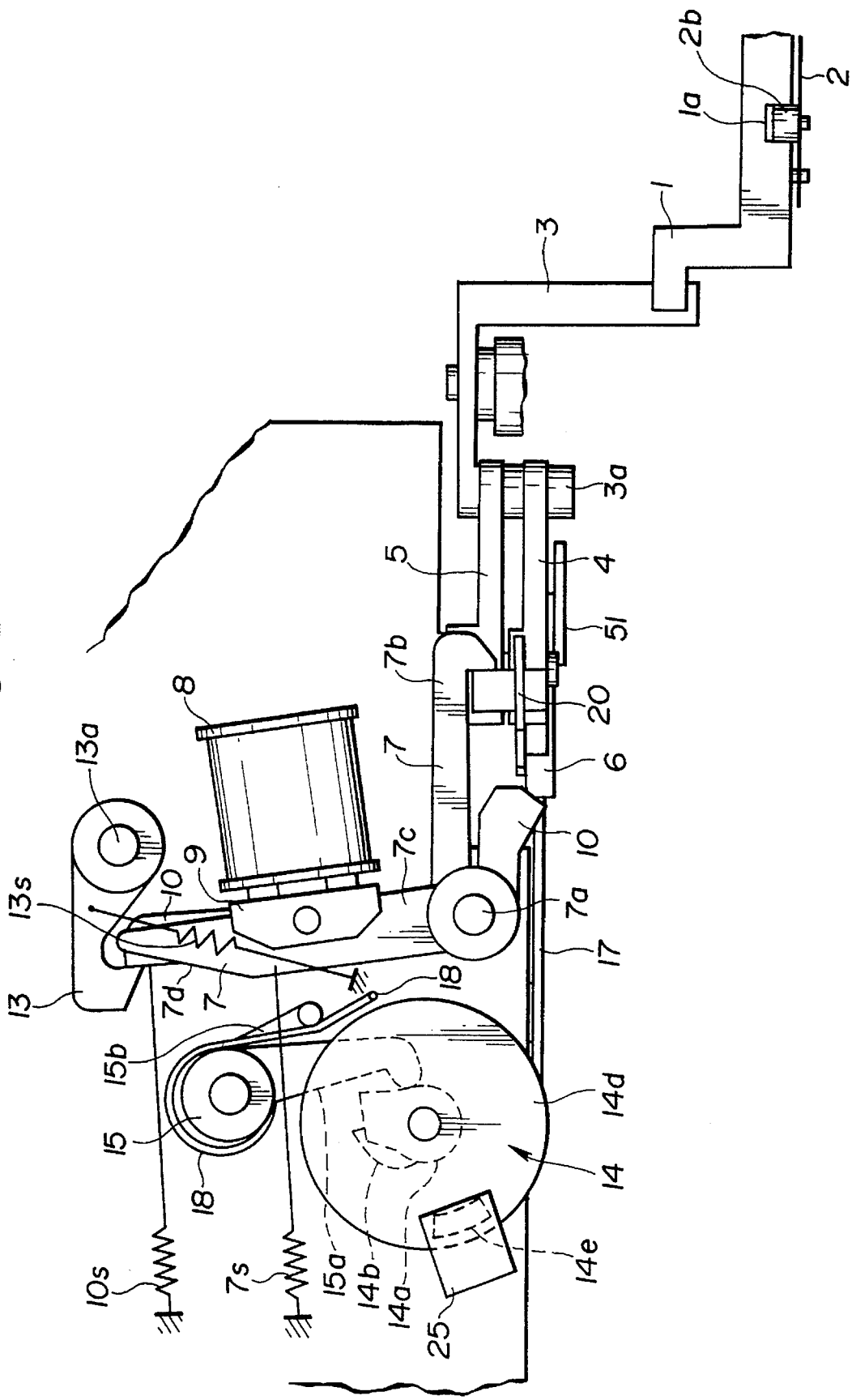
FIG. 22 is a plan view showing the lens shutter mechanism of the second embodiment.

The opening stoppage member 7 then turns counterclockwise in FIG. 22 so as to free the sector opening levers 4 and 5. The sector opening levers 4 and 5 turn clockwise in FIG. 2 due to the constraining forces of the springs 22 and 23 attached thereto. This causes the interlock lever 3 to start turning counterclockwise in FIG. 21. An engagement pin 3*a* of the interlock lever 3 presses a slope 51*a* of the bound prevention arm 51.

The opening springs 22 and 23 attached to the sector opening levers 4 and 5 exert forces stronger than the constraining force of the constraining spring 52. The bound prevention arm 51 is therefore pushed away by the force of the interlock lever 3 that is pressed against the slope 51. The bound prevention arm 51 thus turns counterclockwise in FIG. 24 (See FIG. 24).

The interlock lever 3 then turns counterclockwise in FIG. 21, causing the drive ring 1 to rotate clockwise in FIG. 21. The dowels 2*b* of the sectors 2 move accordingly, which causes the sectors to pivot with the rotation center holes 2*a* as centers. Thus, an aperture for exposure is opened (See FIG. 24).

Figure 23:
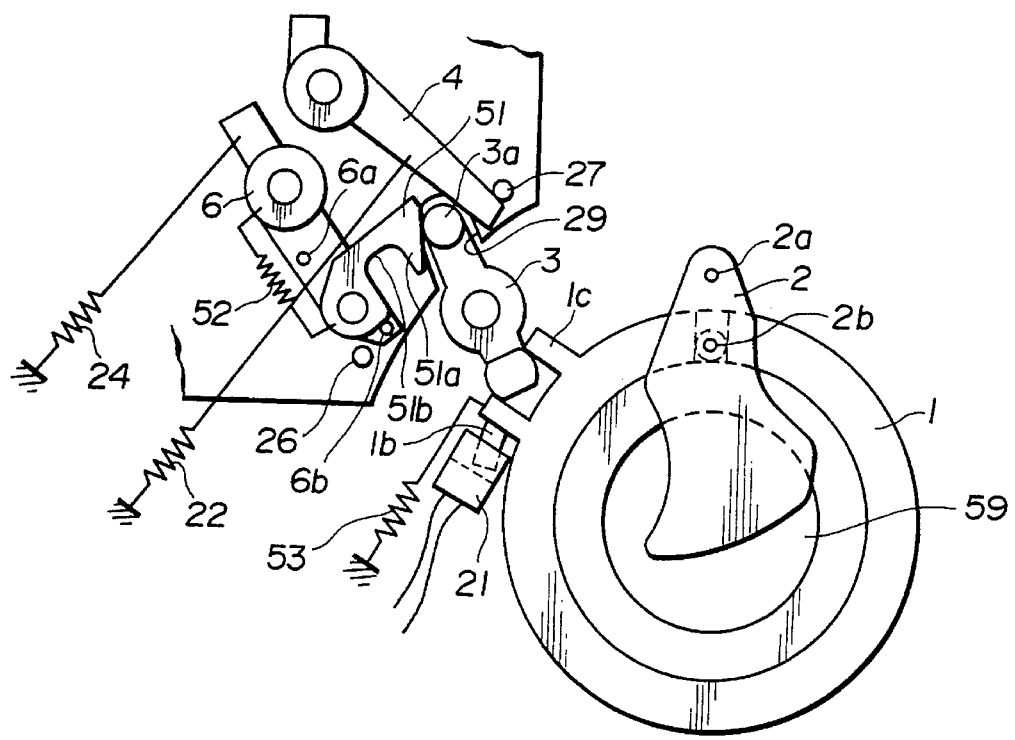
FIG. 23 is a front view showing the major portion of the lens shutter mechanism of the second embodiment that is placed in a set state.
Figure 24:
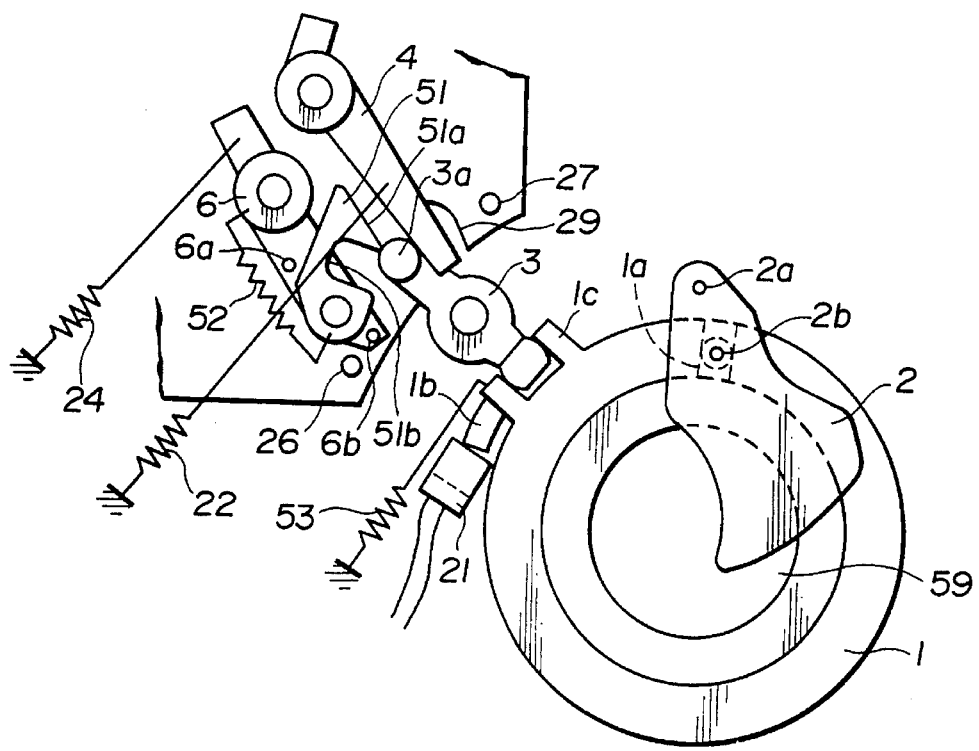
FIG. 24 is a front view showing the major portion of the lens shutter mechanism of the second embodiment in which sectors have just started to open.

The first photo-interrupter 21 detects the rotation of the drive ring 1 by sensing the motion of the fin 1*b* from the position shown in FIG. 23 to the position shown in FIG. 24. When it is detected that the sectors 2 start opening, the control circuit that is not shown starts counting down in seconds.

Figure 25:
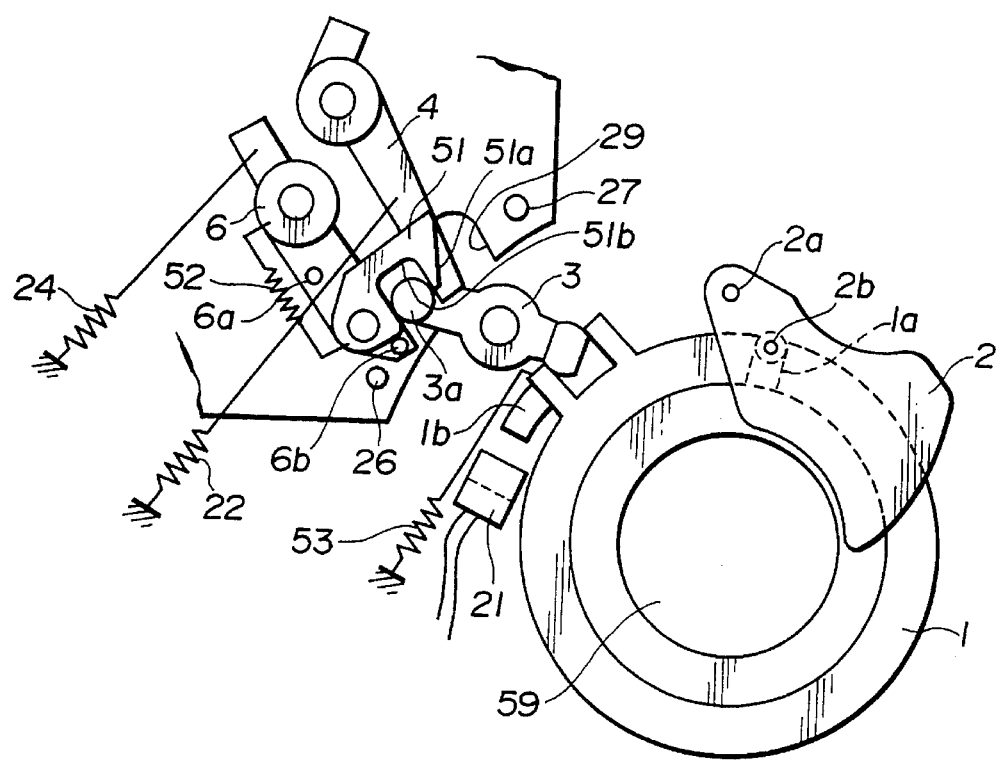
FIG. 25 is a front view showing the major portion of the lens shutter mechanism of the second embodiment in which the sectors are placed in a fully open state.

The sector opening levers 4 and 5 continue to move until, as shown in FIG. 25, the engagement pin 3*a* of the interlock lever 3 is pressed against the sector opening lever 6. Opening is then completed. The sectors 2 are now fully open.

The bound prevention arm 51 has reset to an initial position at which it abuts on the stopper 6*b*. When the engagement pin 3a is trapped in the engagement recess 51b, as shown in FIG. 25, the interlock lever 3 is immobilized.

The sector closing lever 6 is immobilized by the first closing stoppage member 10 and restrained from turning in a direction causing the sectors to close. The bound prevention arm 51 acts to prevent the drive ring 1, sectors, and interlock lever 3, which are moving at a high speed, from rebounding due to an abrupt halt and shielding an aperture 59 unexpectedly.

After designated seconds have elapsed, when the second magnet 11 is cut off, the second closing stoppage member 10 is freed, and turned counterclockwise in FIG. 22 by the constraining force of the spring 10s. The sector closing lever 6 is therefore freed, and turned counterclockwise in FIG. 21 by the constraining force of the spring 24. The sectors 2 are then closed through the interlock lever 3 and drive ring 1.

As mentioned above, the constraining force of the spring 24 attached to the sector closing lever 6 is stronger than the combination of the constraining forces of the springs 22 and 23 attached to the sector opening levers 4 and 5. When the sectors 2 are closed, the sector opening levers 4 and 5 are pushed back by the constraining force of the spring 24 at the same time. The springs 22 and 23 attached to the sector opening levers 4 and 5 are thus.

The bound prevention arm 51 and engagement pin 3a, which engage with each other when the sectors are full open, turn until the sectors 2 are full closed. During the turning, their trajectories separate from each other. The bound prevention arm 51 and engagement pin 3a are therefore duly disengaged from each other. The rotation center of the high-speed sector opening lever 4 differs from that of the sector closing lever 6. When the bound prevention arm 51 and engagement pin 3a are disengaged from each other, the high-speed sector opening lever 4 will not interfere with either of them (See FIG. 26).

Figure 26:
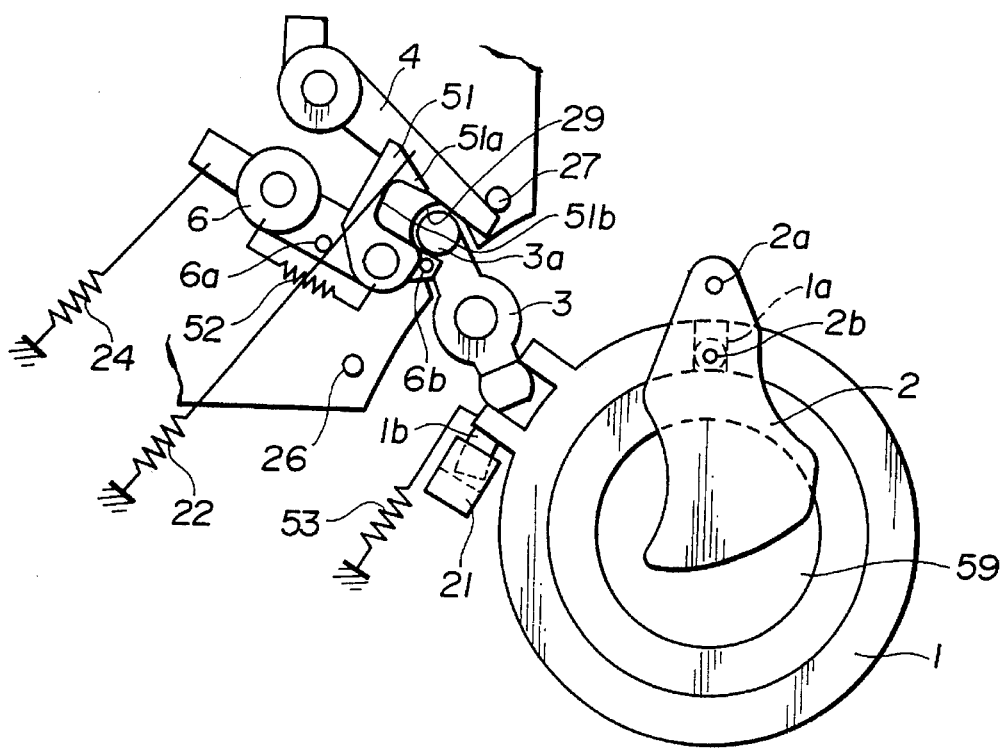
FIG. 26 is a front view showing the major portion of the lens shutter mechanism of the second embodiment in which the sectors are placed in a fully closed state.

As shown in FIG. 26, when the sector opening levers 4 and 5 abut on the second stopper 27 and come to a halt, the sectors 2 are fully closed. At this time, the sector opening levers 4 and 5 have been pushed back to the initial set positions.

When the first photo-interrupter 21 detects that the sectors 2 are closed, the control circuit causes a motor that is not shown to conduct and allows the charge cam gear 14 to rotate via a gear array.

The first charge member 15 abutting on the first cam 14a turns counterclockwise in FIG. 22, causing a presser 18 thereof to press the opening stoppage member 7. The opening stoppage member 7 then turns clockwise in FIG. 22, thus charging the spring 7s.

The third charge member 17 abutting on the third cam 14c turns counterclockwise in FIG. 21 and thus shifts from a standby position. The distal end of the arm 17b causes the sector closing lever 6 to turn clockwise in FIG. 21. The sector closing lever 6 moves to a position at which the sector closing lever 6 is immobilized by the first closing stoppage member 10. In that state, the sector closing lever 6 is pressed and retained. When the sector closing lever 6 is moved to the set position, the bound prevention arm 51 is not engaged with the engagement pin 3a but is reset to the initial position shown in FIG. 23.

Finally, the second charge member 16 abutting on the second cam 14b turns counterclockwise in FIG. 22. This causes the first closing stoppage member 10 to turn clockwise in FIG. 22. The spring 10s is therefore charged. The distal end of the first closing stoppage member 10 presses the slope formed along the edge of the hook-like distal portion of the second closing stoppage member 13, and pushes through the constraining force of the spring 13s. The first closing stoppage member 10 thus returns to the standby position at which it is immobilized by the second closing stoppage member 13. The sector closing lever 6 is immobilized and retained by the first closing stoppage member 10 in the course of turning counterclockwise in FIG. 21 due to the constraining force of the spring 24.

During the foregoing charge, the first charge member 15 and second charge member 16 charge the opening stoppage member 7 and first closing stoppage member 10 respectively so as to press them beyond their stoppage positions. This is intended to ensure attraction of the first magnet receptor 9 attached to the opening stoppage member 7 by the first magnet 8 and also ensure engagement of the first closing stoppage member 10 with the second closing stoppage member 13. The opening stoppage member 7 and first closing stoppage member 10 come to a halt when abutting on the first magnet 8 and second magnet 11. Overcharge exerted by the first and second charge members 15 and 16 is absorbed by the pressers 18 and 19 that are springs.

Thus, the charge members 15, 17, and 16 abutting on associated cams of the charge cam gear 14 charge the opening stoppage member 7, sector closing lever 6, and first closing stoppage member 10 respectively in that order. Thereafter, the first charge member 15 and second charge member 16 are reset to the standby positions.

After the members have completed charge, the opening stoppage member 7 immobilizes the sector opening levers 4 and 5, and is retained by the permanent magnet in the first magnet 8 that is nonconducting. The first closing stoppage member 10 immobilizes the sector closing lever 6, and is immobilized and retained by the second closing stoppage member 13 (See FIGS. 21 and 22).

When the second photo-interrupter 25 detects that the foregoing charge sequence is completed, the control circuit that is not shown determines that charge is completed, and cuts off the motor. Thus, all movements are completed, and the component parts return to the states in which they are placed before making movements.

The second embodiment has substantially the same advantages as the first embodiment. When shuttering is executed to cause sectors to open, it can be prevented that the sectors rebound to block an aperture accidentally; that is, occurrence of a rebound or bounce can be prevented. Furthermore, after shuttering is completed, when such members as sector driving levers and springs are returned to set positions, the members can be freed and reset without any special release movement. Resetting to be performed after exposure is completed can be achieved quickly without moving a bound prevention lever. The second embodiment is therefore very useful for, for continuous photography, for example.

This results in a lens shutter mechanism for a camera that can prevent an accidental rebound or bounce and ensure accurate movements despite the quite simplicity.

In the present invention, it will be apparent that a wide range of different working modes can be formed on the basis of the invention without departing from the spirit and scope of the invention. This invention is limited only by the appended claims but not restricted to any specific embodiment.

What is claimed is:

1. A camera having a lens shutter mechanism, comprising:

a shutter means for forming a predetermined exposure aperture;

a shutter driving means for opening said shutter means;

an aperture speed selecting means for selecting an aperture speed; and an aperture speed changing means interlocked with said aperture speed selecting means in order to drive said shutter driving means, said aperture speed changing means including a plurality of lever means constrained to move in the same direction by a plurality of elastic means.

2. A camera having a lens shutter mechanism according to claim 1, wherein said aperture speed changing means includes two lever means; wherein when said two lever means move simultaneously, said shutter means is opened and closed at a high speed; and wherein when only one of said lever means moves, said shutter means is opened and closed at a low speed.

3. A camera having a lens shutter mechanism according to claim 1, further comprising an initial position resetting means for resetting said aperture speed changing means to an initial position after exposure is completed.

4. A camera having a lens shutter mechanism according to claim 3, wherein said initial position resetting means has a resetting means for resetting said plurality of moved lever means to initial positions; and wherein said resetting means is constrained to move in a direction opposite to the direction, in which said plurality of lever means are constrained to move, by means of an elastic means having stronger elasticity.

5. A camera having a lens shutter, comprising:

shutter blades for exposing film to photographic light or intercepting said photographic light;

an opening and closing means for opening and closing said shutter blades;

a first driving means having a constraining means for driving said opening and closing means so as to drive said shutter blades in a direction permitting opening;

a second driving means having a constraining means different from said constraining means, and thus cooperating with said first driving means in driving said opening and closing means so as to drive said shutter blades in a direction permitting opening; and a driving selecting means that selects whether said first driving means alone should be driven or both said first and second driving means should be driven.

6. A camera having a lens shutter, comprising:

shutter blades for exposing film to photographic light or intercepting said photographic light;

an opening and closing means for opening and closing said shutter blades;

a first driving means for driving said opening and closing means so as to drive said shutter blades in a direction permitting opening;

a second driving means that cooperates with said first driving means in driving said opening and closing means so as to drive said shutter blades in a direction permitting opening; and a driving selecting means that selects whether said first driving means alone should be driven or both said first and second driving means should be driven.

7. A camera having a lens shutter according to claim 5 or 6, further comprising an opening driving means for driving said opening and closing means so as to drive said shutter blades in a direction permitting closing.

8. A camera having a lens shutter according to claim 5 or 6, wherein an aperture speed provided by said first driving means is lower than that provided by said first driving means and second driving means.

9. A camera having a lens shutter mechanism according to claim 4, further comprising a bound prevention means resting on said resetting means so as to turn freely, wherein said bound prevention means retains said moved lever means at predetermined positions immediately before said shutter means completes opening, and frees said lever means by making such a movement as not to interfere with said shutter driving means when said lever means are reset to initial positions by said resetting means.

10. A camera having a lens shutter mechanism according to claim 1, wherein a shutter speed changing means is located near above or below a spool chamber, a Patrone chamber in which a Patrone is loaded, or a battery chamber in a camera body.

11. A camera having a lens shutter mechanism, comprising:

a shutter means for forming a predetermined exposure aperture;

a shutter opening and closing means for opening and closing said shutter means;

an opening means for driving said shutter opening and closing means so that said shutter means forms said predetermined exposure aperture;

a closing means for driving said opening means in a direction causing said shutter means to close said exposure aperture; and a bound prevention means for preventing said opening means from bounding and for retaining said opening means at a predetermined position.

12. A camera having a lens shutter mechanism 11, wherein said bound prevention means retains said opening means at said predetermined position immediately before said shutter means completes opening, and frees said opening means by making such a movement as not to interfere with said opening means, which moves in a direction causing said shutter means to close, when said closing means moves said opening means in said direction causing said shutter means to close.

13. A camera having a lens shutter, comprising:

shutter blades for exposing film to photographic light or intercepting said photographic light;

an opening and closing means for opening and closing said shutter blades;

an opening driving means for driving said opening and closing means so as to drive said shutter blades in a direction permitting opening; and a closing driving means for driving said opening and closing means so as to drive said shutter blades in a direction permitting closing, said closing driving means having an open state retaining member;

said open state retaining member retaining an opening driving state in which said opening and closing means is driven by said opening driving means, and thus retaining an open state in which said shutter blades are driven by said opening and closing means;

said open state retaining means being interlocked with said opening driving means in order to free said opening and closing means from said opening driving state.

14. A collapsible camera having a lens shutter mechanism, comprising:

a shutter means lying in a lens frame and forming an exposure aperture;

a shutter opening and closing means lying in said lens frame so as to turn freely and causing said shutter means to open and close responsively to the turning;

a restraining means that is formed in a securing support for supporting said lens frame, that when said lens frame collapses, guides said shutter opening and closing means resting on said lens frame, and that when said lens frame completes collapsing, restrains said shutter opening and closing means from turning; and a rotation control means that is locked in a securing support for supporting said lens frame, and that when said lens frame thrusts at a position permitting photography, rotates said shutter opening and closing means in a predetermined direction.

15. A collapsible camera according to claim 14, wherein said restraining means is a groove bored in said securing support.

16. A collapsible camera according to claim 14, wherein said shutter opening and closing means includes a conveying member for conveying a driving force provided by said rotation control means and a rotary member for opening and closing said shutter means by means of a driving force conveyed by said conveying member.

17. A camera having a lens shutter, comprising:

shutter blades for exposing film to photographic light and intercepting said photographic light;

an opening and closing means for opening and closing said shutter blades;

a photographic optical system having at least said opening and closing means, being movable along the optical axis, and lying at different positions along the optical axis between a photographic state and a non-photographic state;

an opening driving means for driving said opening and closing means so as to drive said shutter blades in a direction permitting opening, said opening driving means being engaged with said opening and closing means only when said optical system lies at a position associated with said photographic state;

a closing driving means for driving said opening and closing means so as to drive said shutter blades in a direction permitting closing, said closing driving means being engaged with said opening and closing means only when said optical system lies at a position associated with said photographic state; and an opening and closing restricting means that when said photographic optical system lies at a position different from said position associated with said photographic state, restricts movements of said opening and closing means.

18. A camera having a lens shutter according to claim 17, wherein said opening and closing restricting means is located in a camera body.

19. A camera having a lens shutter according to claim 17, wherein said opening and closing restricting means is located in a lens frame securing member.

20. A camera having a lens shutter according to claim 17, wherein said opening driving means and closing driving means are located in a camera body.

21. A camera having a lens shutter according to claim 20, said opening driving means and closing driving means are located above or below a spool chamber in said camera body.

22. A camera having a lens shutter according to claim 20, said opening driving means and closing driving means are located above or below a Patrone chamber in said camera body.

23. A camera having a lens shutter according to claim 20, wherein said opening driving means and closing driving means are located above or below a battery chamber in said camera body.

24. A camera having a lens shutter mechanism, comprising:

a lens frame;

a shutter means in said lens frame for forming a predetermined exposure aperture;

a shutter driving means in said lens frame for opening said shutter means;

an aperture speed selecting means outside of said lens frame for selecting an aperture speed; and an aperture speed changing means outside of said lens frame and interlocked with said aperture speed selecting means in order to drive said shutter driving means, said aperture speed changing means including a plurality of lever means constrained to move in the same direction by a plurality of elastic means.

25. A camera having a lens shutter mechanism according to claim 24, said shutter driving means further includes means selectively operated by said level means and extending into said lens frame for operating said shutter drive means.

* * * * *